(12) United States Patent
Hibino

(10) Patent No.: US 10,673,359 B2
(45) Date of Patent: Jun. 2, 2020

(54) DEVICE FOR DETECTING ROTATION POSITION AND AIR CONDITIONER

(71) Applicant: DAIKIN INDUSTRIES, LTD., Osaka-shi, Osaka (JP)

(72) Inventor: Hiroshi Hibino, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 548 days.

(21) Appl. No.: 14/418,387

(22) PCT Filed: Jul. 30, 2013

(86) PCT No.: PCT/JP2013/070612
§ 371 (c)(1),
(2) Date: Mar. 25, 2015

(87) PCT Pub. No.: WO2014/021321
PCT Pub. Date: Feb. 6, 2014

(65) Prior Publication Data
US 2015/0211894 A1    Jul. 30, 2015

(30) Foreign Application Priority Data
Jul. 30, 2012  (JP) ................................ 2012-168348

(51) Int. Cl.
*H02P 6/18*    (2016.01)
*F04B 49/10*   (2006.01)
(Continued)

(52) U.S. Cl.
CPC .............. *H02P 6/188* (2013.01); *F04B 49/06* (2013.01); *F04B 49/10* (2013.01);
(Continued)

(58) Field of Classification Search
CPC .. F04B 25/06; F04B 2203/0202; F04B 49/06; F04B 49/065; F04B 49/10; F04D 25/08;
(Continued)

(56) References Cited

U.S. PATENT DOCUMENTS

| 4,495,450 A | 1/1985 | Tokizaki et al. |
| 8,436,563 B2 | 5/2013 | Sumita et al. |
| 2011/0050209 A1* | 3/2011 | Nase .......................... H02P 6/18 324/133 |

FOREIGN PATENT DOCUMENTS

| EP | 2224587 A1 | 9/2010 |
| EP | 2615734 A1 | 7/2013 |

(Continued)

OTHER PUBLICATIONS

JP2007166695 translation, Takao 2007.*
(Continued)

*Primary Examiner* — Bryan M Lettman
(74) *Attorney, Agent, or Firm* — Birch, Stewart, Kolasch & Birch, LLP

(57) ABSTRACT

A detector detects whether or not a first line induced voltage and a second line induced voltage match each other, the first line induced voltage being a potential difference of a first phase potential of phase potentials relative to a reference potential, and the second line induced voltage being a potential difference of a second phase potential of the phase potentials other than the first phase potential relative to the reference potential. The phase potentials is outputted by the armature due to an induced electromotive force. The reference potential is any one of a minimum phase and a maximum phase. A rotation-position setting unit sets, to a predetermined value, an estimation value of a rotation position of the motor 2 at a point in time when the first line induced voltage and the second line induced voltage match each other.

13 Claims, 16 Drawing Sheets

(51) Int. Cl.
  *F04D 27/00* (2006.01)
  *F04B 49/06* (2006.01)
  *F04D 15/00* (2006.01)

(52) U.S. Cl.
  CPC ..... *F04D 15/0077* (2013.01); *F04D 15/0088* (2013.01); *F04D 15/0094* (2013.01); *F04D 27/001* (2013.01)

(58) Field of Classification Search
  CPC ............... F04D 27/001; F04D 15/0088; F04D 15/0077; F04D 15/0094; H02P 1/00; H02P 3/00; H02P 1/46; H02P 3/18; H02P 6/00; H02P 6/14; H02P 6/18; H02P 27/04; H02P 27/06; H02P 21/00; H02P 41/00; H02P 6/188
  See application file for complete search history.

(56) References Cited

FOREIGN PATENT DOCUMENTS

| | | | |
|---|---|---|---|
| JP | 2609840 B2 | | 5/1997 |
| JP | 2005-137106 A | | 5/2005 |
| JP | 2007-166695 A | | 6/2007 |
| JP | 2007166695 | * | 6/2007 |
| JP | 2009-77503 A | | 4/2009 |
| JP | 2010-233390 A | | 10/2010 |
| JP | 2011-19348 A | | 1/2011 |
| WO | WO 2012/032571 A1 | | 3/2012 |

OTHER PUBLICATIONS

JP2007166695 translation, translated Jun. 2017.*
International Search Report issued in PCT/JP2013/070612, dated Oct. 22, 2013.

* cited by examiner

F I G . 2
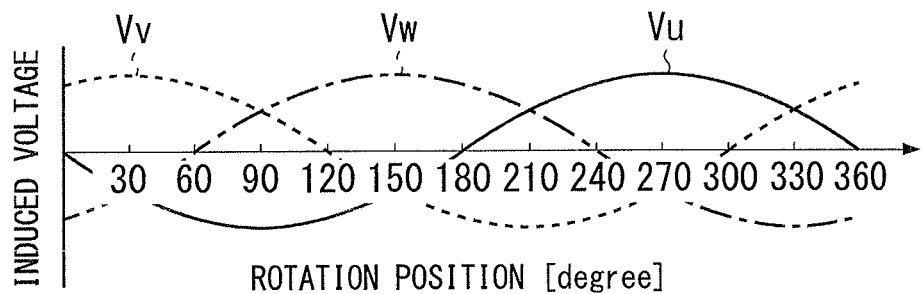
F I G . 3
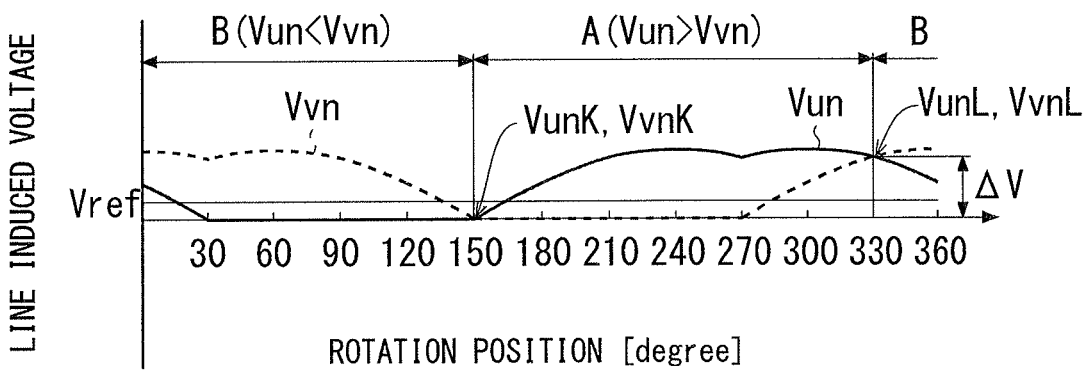
F I G . 4
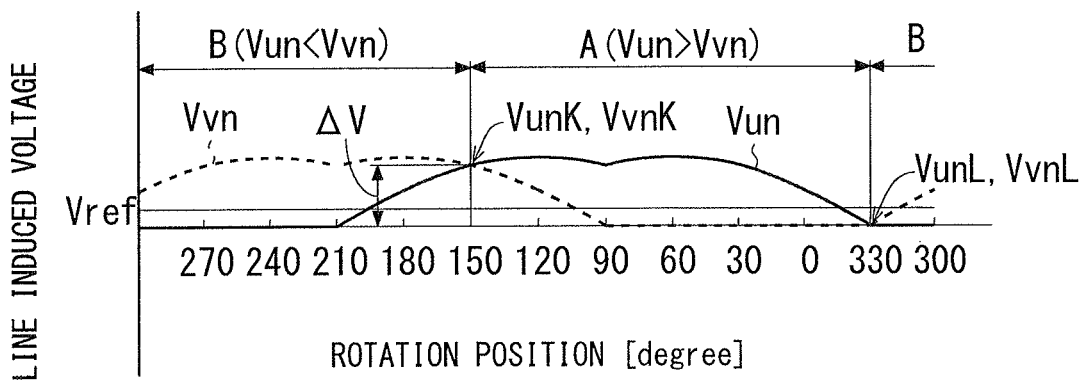

F I G . 2 2
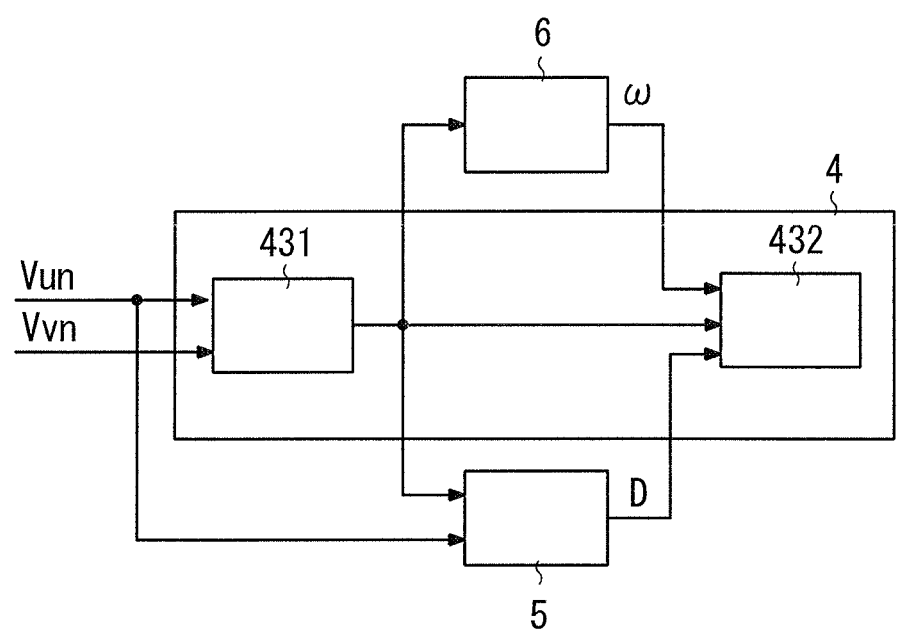

F I G. 2 5
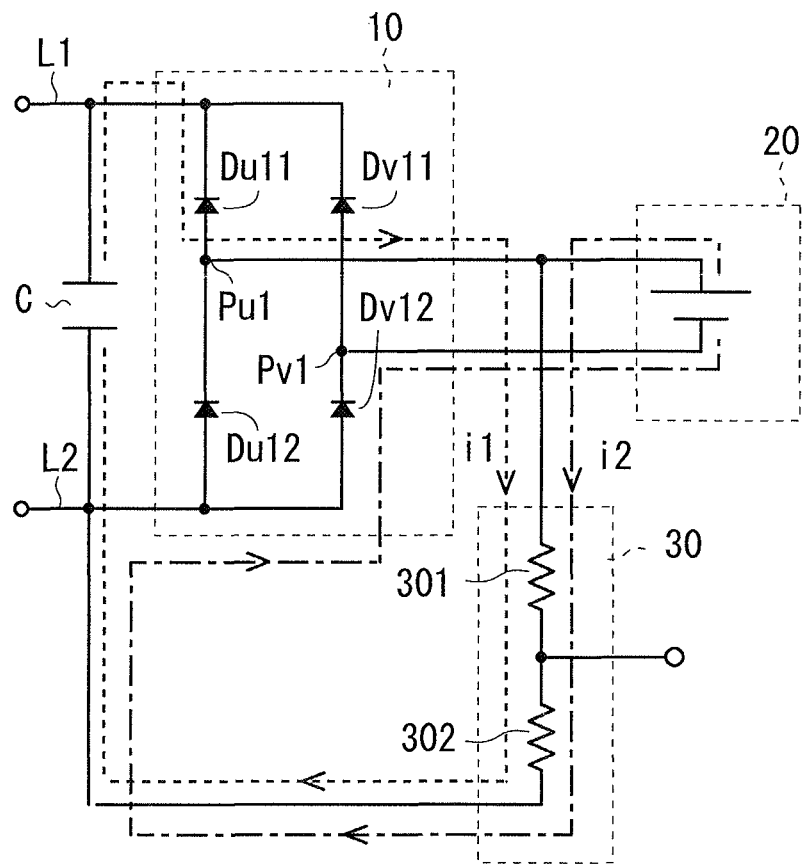
F I G. 2 6
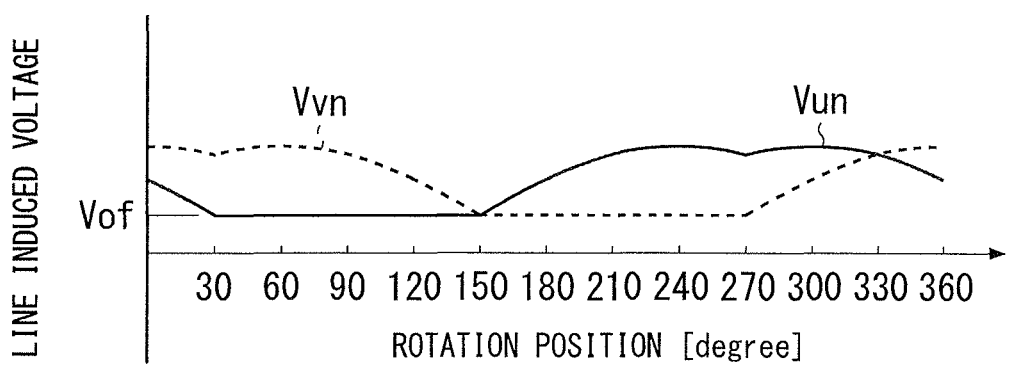

DEVICE FOR DETECTING ROTATION POSITION AND AIR CONDITIONER

TECHNICAL FIELD

The present disclosure relates to a device for detecting a rotation position and an air conditioner, and particularly relates to a motor control device that controls a motor having a permanent magnet.

BACKGROUND ART

In Japanese Patent Application Laid-Open No. 2010-233390 an inverter that drives a permanent-magnet synchronous motor is described, and a rotation position of the motor is detected based on a line voltage of the motor. In Japanese Patent Application Laid-Open No. 2010-233390, phase voltages are detected, and a line voltage is calculated based on these phase voltages. Then, by detecting a zero-crossing point of these line voltages, a rotation position of the motor is determined to a position corresponding to the zero-crossing point.

Further, as techniques relevant to the present disclosure, Japanese Patent Application Laid-Open No. 2011-19348 and Japanese Patent No. 2609840 are disclosed.

SUMMARY

Problems to be Solved

In order to detect a rotation position, there is considered employment of a line voltage using a minimum phase of the phase voltage instead of the line voltage, as a reference. Then, by applying the technique of Japanese Patent Application Laid-Open No. 2010-233390, a rotation position is detected based on intersections between the line voltages using the minimum phase as a reference, and a predetermined value determined in advance.

However, the line voltage using such a minimum phase as a reference can generate an offset, due to the influence of a direct current (DC) voltage that is input to the inverter or a floating capacitance and the like. In the present application, while causes of the occurrence of the offset are unmentioned, one example thereof will be described in detail below.

FIG. 25 is an equivalent circuit diagram for describing a reason of the occurrence of the offset. In FIG. 25, a capacitor C is shown between a DC line L1 and a DC line L2. The capacitor C is charged with a DC voltage having a potential at a DC line L1 side as a high potential. This DC voltage is input to a voltage source inverter 10.

Now, a case where switching elements of the inverter 10 are all nonconductive is considered. At this time, an equivalent circuit of the inverter 10 is expressed as a diode bridge which is configured by diodes that are respectively inversely parallel connected to the switching elements. In FIG. 25, configurations of two phase components out of the inverter 10 are equivalently shown by a pair of diodes Du11 and Du12 and a pair of diodes Dv11 and Dv12.

A motor 20 provided at an output side of the inverter 10 is connected to an output end Pu1 between the pair of diodes Du11 and Du12 and to an output end Pv1 between the pair of diodes Dv11 and Dv12, and is shown as an equivalently DC power supply. In this case, because a state where an induced voltage has occurred in the motor 20 is considered, the induced voltage is grasped as an equivalently DC power supply.

The induced voltage is detected by a voltage detector 30. The voltage detector 30 is shown equivalently by a pair of resistors 301 and 302. The resistors 301 and 302 are connected in series between the output end Pu1 and the DC line L2, for example. The voltage detector 30 outputs both-end voltage of the resistor 302 as detection values, for example.

Then, although all the switching elements of the inverter 10 are nonconductive, actually, a current i1 slightly flows in these switching elements (or the diodes that are inversely parallel connected to the switching elements) (refer to an arrow mark of a broken line in FIG. 25). This current i1 also flows in the voltage detector 30.

On the other hand, at the motor 20 side, when an induced voltage has occurred, a current i2 flows from the output end Pu1 to the DC line L2 via the voltage detector 30 (refer to an arrow mark of a one-dot chain line in FIG. 25).

Accordingly, a voltage detected by the voltage detector 30 includes not only a voltage drop generated in the resistor 302 by the current i2 but also a voltage drop generated in the resistor 302 by the current i1. The voltage drop generated by the current i1 corresponds to the offset. Such an offset varies according to a variation of the DC voltage that enters the inverter 10.

In FIG. 25, although description is made about two phases, this is also similar to three phases. That is, in the induced voltage using the minimum phase as a reference, an offset occurs.

Against the occurrence of an offset in detection values as described above, a predetermined value that forms intersections with the detection values is a value determined in advance, and an offset does not occur. Therefore, these intersections are deviated according to the offset generated in the detection value. Therefore, detection accuracy of a rotation position becomes low.

Therefore, the present disclosure provides a device for rotation position that can detect a rotation position with high accuracy even when an offset has occurred in the detection of a line voltage using the minimum phase as a reference.

Means for Solving the Problems

A first aspect of a device for detecting rotation position of a motor (2) according to the present disclosure, the motor having a field (22) including a permanent magnet, and an armature (21) including coils (21u, 21v, 21w) of three or more phases, the field and the armature relatively rotating, comprising: a detector (431) that detects whether or not a first line induced voltage (Vun) and a second line induced voltage (Vvn) match each other, the first line induced voltage (Vun) being a potential difference of a first phase potential of phase potentials which the armature outputs due to an induced electromotive force relative to a reference potential, and the second line induced voltage (Vvn) being a potential difference of a second phase potential of the phase potentials other than the first phase potential relative to the reference potential, the reference potential being any one of a minimum phase and a maximum phase; and a rotation-position setting unit (432) that sets, to a predetermined value, an estimation value of a rotation position of the motor at a point in time when the first line induced voltage and the second line induced voltage match each other.

A second aspect of a device for detecting rotation position according to the present disclosure is the device for detecting rotation position according to the first aspect. A plurality of AC lines (Pu, Pv, Pw) are connected to the coils (21u, 21v, 21w), respectively, the AC lines are connected to a voltage type inverter (2), and the voltage type inverter is connected to first and second DC lines (L1, L2) at an input side. The device for detecting rotation position further includes a voltage detector (3) that has connecting the first DC line (L1,L2) and a first (Pu) of the AC lines to which the first phase potential (Vu) is applied and a second path (32) connecting the first DC line (L1, L2) and a second (Pv) of the AC lines to which the second phase potential (Vv) is applied, and that detects, as the first line induced voltage (Vun), a first voltage (Vun1, Vun2), a first voltage (Vun1, Vun2) between the first DC line and the first of the AC lines in the first path and, and the second line induced voltage (Vvn), a second voltage (Vvn1, Vvn2) between the first DC line and the second of the AC lines in the second path.

A third aspect of a device for detecting rotation position according to the present disclosure is the device for detecting rotation position according to the second aspect. The voltage detector (3) further has voltage-dividing resistors (R11, R12, R21, R22) that are connected in series with each other in each of the first path (31) and the second path (32), and voltages of the voltage-dividing resistors in the first path and the second path are respectively employed as the first voltage (Vun1) and the second voltage (Vvn1).

A fourth aspect of a device for detecting rotation position according to the present disclosure is the device for detecting rotation position according to the second or third aspect. The voltage detector (3) further includes a detection-voltage limiting unit (33, ZD11, ZD21) that limits the first voltage (Vun1, Vun2) to a predetermined value when the first line induced voltage (Vun) is equal to or greater than a reference value (Vref), and limits the second voltage (Vvn1, Vvn2) to the predetermined value when the second line induced voltage (Vvn) is equal to or greater than the reference value (Vref).

A fifth aspect of a device for detecting rotation position according to the present disclosure is the device for detecting rotation position according to one of the first to fourth aspects. The device for detecting rotation position further includes a rotation-direction specifying unit (5) that specifies a rotation direction of the motor as a predetermined direction, based on a value of the first line induced voltage or the second line induced voltage at the point in time when the first line induced voltage (Vun) and the second line induced voltage (Vvn) match each other.

A sixth aspect of a device for detecting rotation position according to the present disclosure is the device for detecting rotation position according to the fifth aspect. The detector (431) repeatedly detects whether or not the first line induced voltage (Vun) and the second line induced voltage (Vvn) match each other. The rotation-direction specifying unit (5) specifies the rotation direction as the predetermined direction, based on a magnitude relation between a first value (VunL, VvnL) and a second value (VunK, VvnK). The first value is a value of one of the first line induced voltage and the second line induced voltage at the point in time when the first line induced voltage and the second line induced voltage match each other. The second value is a value of the one of the first line induced voltage and the second line induced voltage at a point in time when the first line induced voltage and the second line induced voltage match each other at a last time.

A seventh aspect of a device for detecting rotation position according to the present disclosure is the device for detecting rotation position according to the sixth aspect. A computation result obtained by addition or multiplication of the first line induced voltage and the second line induced voltage at the point in time when the first line induced voltage (Vun) and the second line induced voltage (Vvn) match each other is employed as the first value, and the computation result at a point in time when the first line induced voltage and the second line induced voltage match each other at a last time is employed as the second value.

An eighth aspect of a device for detecting rotation position according to the present disclosure is the device for detecting rotation position device according to the fourth aspect. The detector (431) repeatedly detects a switching of a magnitude relation between the first voltage (Vun1, Vun2) and the second voltage (Vvn1, Vvn2) to repeatedly detect whether or not the first line induced voltage and the second line induced voltage match each other. The device for detecting rotation position further includes a rotation-direction specifying unit (5) that specifies a rotation direction of the motor (2) as a predetermined direction when a phenomenon that the first voltage becomes higher than the second voltage to switch the magnitude relation occurs at least twice in succession, and that specifies the rotation direction as a direction opposite to the predetermined direction when a phenomenon that the first voltage becomes lower than the second voltage to switch the magnitude relation is switched occurs at least twice in succession.

A ninth aspect of a device for detecting rotation position according to the present disclosure is the device for detecting rotation position according to the fourth aspect. The detector (431) detects whether the first voltage (Vun1, Vun2) becomes higher than the second voltage (Vvn1, Vvn2) and whether the first voltage becomes lower than the second voltage. The device for detecting rotation position further includes a rotation-direction specifying unit (5) that specifies a rotation direction of the motor (2) as a predetermined direction when at least one of the first voltage (Vun1, Vun2) and the second voltage (Vvn1, Vvn2) is smaller than a threshold value equal to or lower than the predetermined value and the first voltage becomes higher than the second voltage, and that specifies the rotation direction as a direction opposite to the predetermined direction when at least one of the first voltage and the second voltage is smaller than the threshold value equal to or lower than the predetermined value and the first voltage becomes lower than the second voltage.

A tenth aspect of a device for detecting rotation position device according to the present disclosure is the device for detecting rotation position according to any one of the second to fifth aspects. The device for detecting rotation position further includes a rotation-direction specifying unit (5) that specifies a rotation direction of the motor (2). The rotation-direction specifying unit calculates similarity between an estimation waveform (Vun_N) similar to the first line induced voltage (Vun) when the rotation direction is a predetermined direction and the first line induced voltage which is detected, and specifies the rotation direction based on the similarity.

An eleventh aspect of a device for detecting rotation position according to the present disclosure is the device for detecting rotation position according to any one of the second to fifth aspects. The device for detecting rotation position further includes a rotation-direction specifying unit (5) that specifies a rotation direction of the motor (2). The rotation-direction specifying unit calculates similarity between an estimation waveform (Vun_N) similar to a waveform obtained by performing a computation of one of addition and multiplication to the first line induced voltage (Vun) and the second line induced voltage (Vvn) when the rotation direction is a predetermined direction, and a waveform obtained by performing the computation to the first line induced voltage and the second line induced voltage which are detected, and specifies the rotation direction based on the similarity.

A twelfth aspect of a device for detecting rotation position according to the present disclosure is the r device for detecting rotation position according to any one of the fifth to eleventh embodiments. The detector (431) repeatedly detects whether or not the first line induced voltage (Vun) and the second line induced voltage (Vvn) match each other. The device for detecting rotation position further includes a rotation speed calculator (6) that calculates a rotation speed of the motor (2) based on a plurality of points in time when the first line induced voltage and the second line induced voltage match each other. The rotation-position setting unit (4), based on the estimation value of the rotation position that is set at the point in time when the first line induced voltage and the second line induced voltage match each other, the rotation direction that is specified by the rotation-direction specifying unit (5), the rotation speed calculated by the rotation speed calculator, and time from a point in time when the estimation value of the rotation position is calculated to other point in time, calculates the rotation position at the other point in time.

A first aspect of an air conditioner according to the present disclosure includes a device for detecting rotation position according to any one of the first to twelfth aspects, the motor (2), and a fan that is driven by the motor.

Effects

According to the first aspect of the device for detecting rotation position (4) relating to the present disclosure, because a rotation position is determined when the first line induced voltage and the second line induced voltage match each other, even when an offset has occurred in common in the first line induced voltage and the second line induced voltage, the switching point in time does not vary. Accordingly, estimation accuracy of a rotation position can be enhanced.

According to the second aspect of the device for detecting rotation position relating to the present disclosure, as compared with the case of detecting an induced voltage of the AC line, extracting the induced voltage of the minimum phase from the detected induced voltage, and calculating the line induced voltage by subtracting the induced voltage of the minimum phase from the induced voltage, the first line induced voltage and the second line induced voltage can be easily obtained (that is, without a computation).

According to the third aspect of the device for detecting rotation position relating to the present disclosure, the first voltage and the second voltage smaller than the first line induced voltage and the second line induced voltage can be detected. Accordingly, a withstanding pressure of the rotation-position estimating unit can be reduced.

According to the fourth aspect of the device for detecting rotation position relating to the present disclosure, because the first voltage and the second voltage that are used in the detector and the rotation-position setting unit are limited to the predetermined value, application of a large voltage (excess voltage) in the detector and the rotation-position setting unit can be avoided.

According to the fifth aspect of the device for detecting rotation position relating to the present disclosure, as compared with the case of detecting a rotation direction by using a rotation-position detection sensor and the like, because the rotation-position detection sensor is expensive, manufacturing cost can be reduced.

According to the sixth aspect of the device for detecting rotation position relating to the present disclosure, because one of the first line induced voltages and one of the second line induced voltages are compared together, the rotation direction can be properly specified when the maximum value of the line induced voltages Vun and Vvn becomes lower than the threshold value.

According to the seventh aspect of the device for detecting rotation position relating to the present disclosure, because the difference between the computation results can be made larger than the difference between the first line induced voltages and the difference between the second line induced voltages, there occurs little error in the comparison between the first value and the second value.

According to the eighth aspect of the device for detecting rotation position relating to the present disclosure, during the period in which the first line induced voltage and the second line induced voltage respectively exceed the reference value, the first voltage and the second voltage employ a predetermined value. In such a case, when the first voltage can continuously exceed or become lower than the second voltage by at least twice, the rotation direction can be properly specified even in this case.

According to the ninth aspect of the device for detecting rotation position relating to the present disclosure, during the period in which the first line induced voltage and the second line induced voltage respectively exceed the reference value, the first voltage and the second voltage employ a predetermined value. Even in this case, the rotation direction can be properly specified.

According to the tenth and eleventh aspects of the device for detecting rotation position relating to the present disclosure, the rotation direction can be specified.

According to the twelfth aspect of the device for detecting rotation position relating to the present disclosure, because the estimation value of the rotation position at other point in time is calculated, this can be used for a start control of the motor.

According to the first aspect of the air conditioner relating to the present disclosure, the fan provided in the outdoor machine that is laid out outdoors rotates by the flow of air (wind) even when the AC voltage is not applied to the motor. At this time, because only the induced voltage appears in the AC line, the line induced voltage can be easily obtained.

An object, characteristics, phases, and advantages of the present disclosure will become more clearer by the following detailed description and appended drawings.

BRIEF DESCRIPTION OF DRAWINGS

FIG. 2 is a diagram showing a schematic example of an induced voltage in a forward rotation direction;

FIG. 3 is a diagram showing a schematic example of a line induced voltage in a forward rotation direction;

FIG. 4 is a diagram showing a schematic example of a line induced voltage in a reverse rotation direction;

FIG. 22 is a diagram showing an example of a conceptual configuration of a rotation position detector, a rotation-direction specifying unit, and a rotation speed calculator;

FIG. 25 is a diagram for describing a reason for the occurrence of an offset in a line induced voltage; and FIG. 26 is a diagram showing a schematic example of a line induced voltage in a forward rotation direction.

DESCRIPTION OF EMBODIMENTS

First Embodiment

Figure 1:
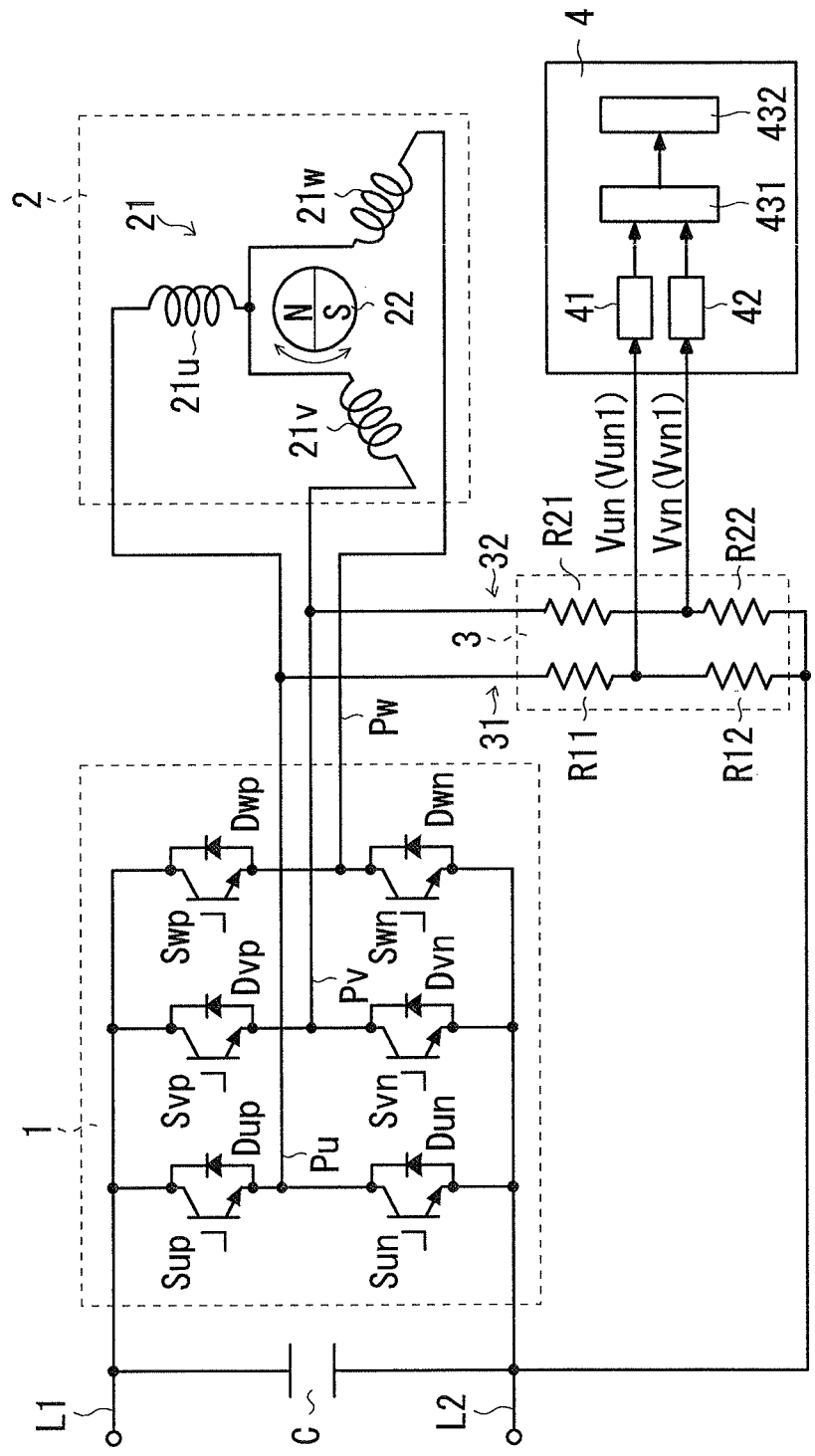
FIG. 1 is a diagram showing an example of a conceptual configuration of a motor control device.

As shown in FIG. 1, the present motor control device includes a power converter 1, a motor 2, and a rotation position detector 4.

The power converter 1 is connected to DC lines L1 and L2 at an input side thereof, and is connected to AC lines Pu, Pv, and Pw at an output side thereof. Between the DC lines L1 and L2, a DC voltage is applied. This DC voltage is applied by a converter not shown, for example. This converter converts an AC voltage from a commercial AC power supply, for example, to a DC voltage, and applies this to between the DC lines L1 and L2. As such a converter, a diode rectification circuit formed by a diode bridge, for example, can be employed. For the voltage of the commercial AC power supply, any one of 100V, 200V, 220V, and 400V can be employed, for example. In the case where the commercial AC power supply outputs a single-phase AC voltage, the DC voltage is √2 of the voltage of the commercial AC power supply, and becomes 141V, 283V, 311V, and 566V respectively. In the exemplification of FIG. 1, a capacitor C is provided between the DC lines L1 and L2, and smoothens the DC voltage. The power converter 1 converts the DC voltage to an AC voltage, and applies this to the AC lines Pu, Pv, and Pw.

To the AC lines Pu, Pv, and Pw, the motor 2 is connected, and the motor 2 includes an armature 21 and a field 22. The armature 21 has armature coils $21u$, $21v$, $21w$ in three phases, and the armature coils $21u$, $21v$, and $21w$ are connected to AC lines Pu, Pv, and Pw. To the armature coils $21u$, $21v$, and $21w$, the three-phase AC voltages from the power converter 1 are applied. Accordingly, the AC current flows to the armature coils $21u$, $21v$, and $21w$, and a rotation magnetic field is applied to the field 22. The field 22 has a permanent magnet, and supplies a field magnetic flux to the armature 21. Then, the field 22 receives a rotation magnetic field from the armature 21, and rotates relatively to the armature 21.

In the exemplification of FIG. 1, because the motor 2 having the armature coils $21u$, $21v$, and $21w$ in three phases is assumed, although the power converter 1 outputs three-phase AC voltages, this is not necessarily limited. By employing the motor 2 of N phases larger than three phases, the power converter 1 of the N phases may be similarly employed. In the exemplification of FIG. 1, although the armature coils $21u$, $21v$, and $21w$ are connected to each other by what is called a star connection, the armature coils $21u$, $21v$, and $21w$ may be connected to each other by what is called a delta connection.

In such a motor driving device, in the case where the motor 2 has rotated, magnetic flux that passes through the armature coils $21u$, $21v$, and $21w$ changes based on the rotation. Along with this, in the armature coils $21u$, $21v$, and $21w$, an induced electromotive force based on the rotation occurs, respectively, and the motor 2 outputs phase potentials (hereinafter, also referred to as induced voltages) Vu, Vv, and Vw to the AC lines Pu, Pv, and Pw (also refer to FIG. 2), respectively.

Such a motor 2 is used for an air blower such as a fan and a blower, for example. For example, the motor 2 may drive a fan or a compressor installed in the heat pump (an air conditioner, a water heater, and the like). For example, in the case of driving the fan installed in the outdoor unit laid out outdoors, even when the power converter 1 is not in the state of outputting the AC voltage to the motor 2, the fan rotates by the flow of outdoor air (wind). Therefore, at the time of starting such a motor 2, it is necessary to detect a relative rotation position between the armature 21 and the field 22 (hereinafter, referred to as rotation position of the motor 2). Certainly because the compressor or the fan rotates by inertia even when not rotated by an external force, it is also necessary to detect the rotation position in the case of rotating this again.

A rotation position detector 4 detects the rotation position of the motor 2, based on line induced voltages Vun and Vvn described below. As a reference potential of the line induced voltages Vun and Vvn, the induced voltage of the minimum phase out of induced voltages Vu, Vv, and Vw is employed. That is, the line induced voltage Vun is a potential difference relative to the reference potential of the induced voltage Vu, and the line induced voltage Vvn is a potential difference relative to the reference potential of the induced voltage Vv. Details will be described below.

The induced voltages Vu, Vv, and Vw take approximately a sine wave shape that changes depending on a rotation position (electric angle) of the motor 2 as exemplified in FIG. 2.

Further in FIG. 2, the induced voltages Vu, Vv, and Vw when the motor 2 rotates in the forward rotation direction are exemplified. In the forward rotation direction, the induced voltages Vv and Vw proceed by 120 degrees relative to the induced voltage Vu and Vv, respectively. That is, such a rotation direction is defined as a forward rotation direction.

In the forward rotation direction (FIG. 2), the induced voltage Vu takes a minimum value when the rotation position is in the range from 30 degrees to 150 degrees, for example, therefore, in this range, the induced voltage of the minimum phase becomes the induced voltage Vu. Accordingly, in this range, the line induced voltage Vun is zero as exemplified in FIG. 3. Further, when the rotation position is in the range from 150 degrees to 270 degrees, the induced voltage Vv is the induced voltage of the minimum phase, and therefore, in this range, the line induced voltage Vun is the potential difference between the induced voltage Vu and the induced voltage Vv of the minimum phase, and takes a waveform exemplified in FIG. 3. This is also similar in other range. Further, the line induced voltage Vvn is a potential difference between the induced voltage Vv and the induced voltage of the minimum phase, and takes a waveform exemplified in FIG. 3.

When the rotation direction is the reverse rotation direction, the induced voltages Vv and Vw are delayed by 120 degrees relative to the induced voltages Vu and Vv, respectively. Therefore, the line induced voltages Vun and Vvn at this time take a waveform exemplified in FIG. 4.

Referring to FIGS. 3 and 4, the rotation position at a point in time when the line induced voltages Vun and Vvn match each other takes 150 degrees or 330 degrees without depending on the rotation direction. Further, the rotation position at a point in time when the line induced voltage Vun becomes higher than the line induced voltage Vvn takes 150 degrees without depending on the rotation direction, and the rotation position at a point in time when the line induced voltage Vun becomes lower than the line induced voltage Vvn takes 330 degrees without depending on the rotation direction. Accordingly, when the line induced voltages Vun and Vvn match each other, the rotation position can be determined.

The rotation position detector 4 includes a detector 431 and a setting unit 432. Here, the rotation position detector 4 is configured to include a microcomputer and a storage device. The microcomputer executes each processing step (that is, a procedure) described in a program. The storage device can be configured by one or a plurality of various storage devices such as a ROM (Read-Only-Memory), a RAM (Random-Access-Memory), a rewritable nonvolatile memory (EPROM (Erasable-Programmable-ROM)), and a hard disk device, for example. The storage device stores various kinds of information and data, stores programs that the microcomputer executes, and provides a work area for executing the program. The microcomputer can be accepted to function as various means corresponding to each processing step described in the program, or can be accepted to realize various functions corresponding to each processing step. Further, the rotation position detector 4 may realize, without limiting to this, a part or a whole of various procedures that are executed or various means or various functions that are realized by the rotation position detector 4, by hardware. Further, this content is also applied to a rotation-direction specifying unit 5 and the rotation speed calculator 6 to be described in other embodiments.

The detector 431 inputs the line induced voltages Vun and Vvn, and detects whether or not the line induced voltages Vun and Vvn match each other. For example, by using a known comparing unit that compares large/small of the line induced voltages Vun and Vvn, this can be detected. More specifically, when the magnitude relation between the line induced voltages Vun and Vvn has changed, it is possible to decide that the line induced voltages Vun and Vvn match each other.

The setting unit 432 sets the estimation value of the rotation position of the motor 2 at a point in time when the line induced voltages Vun and Vvn match each other to a predetermined value (for example, 150 degrees or 330 degrees). That is, when the line induced voltage Vun has exceeded the line induced voltage Vvn, the setting unit 432 determines the estimation value of the rotation position to a predetermined value (150 degrees in this case) as the rotation position at a point in time when the line induced voltage Vun has exceeded the line induced voltage Vvn. Further, when the line induced voltage Vun has become lower than the line induced voltage Vvn, the setting unit 432 determines the estimation value of the rotation position to a predetermined value (330 degrees in this case) as the rotation position at a point in time when the line induced voltage Vun has become lower than the line induced voltage Vvn. The detection of the rotation position may be executed only when the line induced voltage Vun has exceeded the line induced voltage Vvn, or may be executed only when the line induced voltage Vun has become lower than the line induced voltage Vvn. Certainly, the rotation position may be detected in both cases. When the rotation position is detected in both cases, the rotation position can be detected in more detail.

As described above, according to the present rotation position detector 4, the rotation position can be detected without depending on the rotation direction of the motor 2. Further, a match between the line induced voltages Vun and Vvn is set as a trigger to a rotation position detection. Accordingly, even when an offset has occurred in common to the line induced voltages Vun and Vvn, a point in time when a magnitude relation is switched does not change. Such an offset is the offset of a detector (described later) that detects the line induced voltages Vun and Vvn, for example. Therefore, reduction in detection accuracy of the rotation position by the offset can be suppressed. That is, detection accuracy of the rotation position can be enhanced.

Further, according to the rotation-position detection method, instead of the induced voltages Vu, Vv, and Vw, the line induced voltages Vun and Vvn are used. In the case of using the induced voltages Vu, Vv, and Vw, their reference potential becomes the potential of a neutral point of the motor 2. Therefore, in order to detect the induced voltages Vu, Vv, and Vw, it is necessary to employ the motor 2 that can output a potential of the neutral point, or to virtually generate a potential of the neutral point of the motor 2. In the former case, there is a limit to the employable motor 2, and in the latter case, the circuit configuration becomes complex. On the other hand, according to the present rotation-position detection method, because the line induced voltages Vun and Vvn are used, the method can be also applied to the motor 2 that cannot output the potential of the neutral point, and circuit design becomes easy.

Further, like Japanese Patent Application Laid-Open No. 2010-233390, in the case of calculating intersections between a line voltage and a predetermined value determined in advance, the following problems also occur. That is, when the rotation speed of the motor 2 is small, the maximum value of the line voltage also becomes small. When the maximum value of the line voltages becomes smaller than a predetermined value, because there is no intersection between the line voltages and the predetermined value, the intersection cannot be calculated. On the other hand, in the present embodiment, because the switching (intersection) of the magnitude relation between the line induced voltages Vun and Vvn is detected, such a situation can be avoided.

In the above example, as two line induced voltages, the line induced voltages Vun and Vvn are employed. However, without limiting to this, out of the line induced voltages Vun, Vvn, and Vwn, arbitrary two may be employed. The line induced voltage Vwn is a potential difference of the induced voltage Vw relative to the induced voltage of the minimum phase.

Table 1 shows a relationship between the line induced voltages Vun and Vwn and the rotation position, and a relationship between the line induced voltages Vvn and Vwn and the rotation position.

TABLE 1

| Line induced voltage | Switching of magnitude relation | Rotation position [degree] |
|---|---|---|
| Vun, Vwn | Vun becomes lower than Vwn | 30 |
|  | Vun exceeds Vwn | 210 |
| Vvn, Vwn | Vvn becomes lower than Vwn | 90 |
|  | Vvn exceeds Vwn | 270 |

Although two line induced voltages are employed in the above example, three line induced voltages may be also employed. When three line induced voltages are employed, because a number of these intersections during one cycle of induced voltages increase, rotation positions can be detected in more detail.

Figure 5:
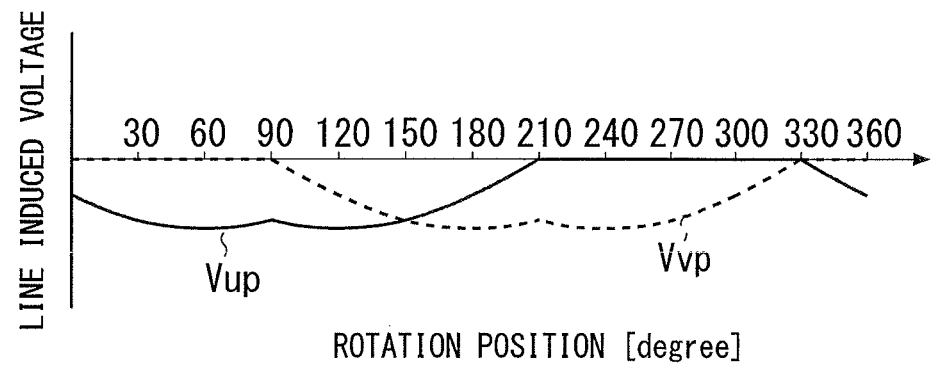
FIG. 5 is a diagram showing a schematic example of a line induced voltage in a forward rotation direction.
Figure 6:
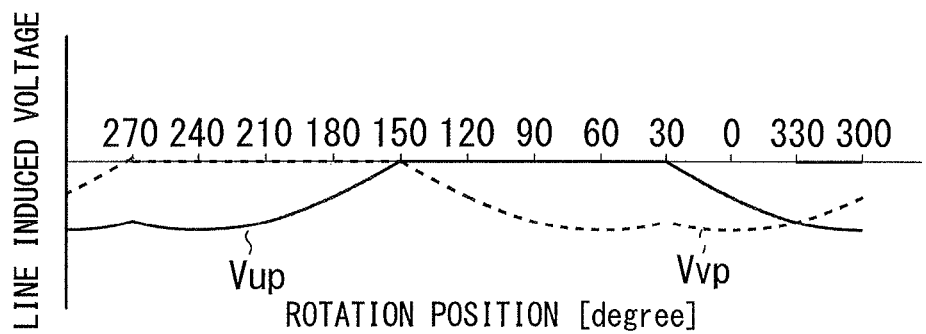
FIG. 6 is a diagram showing a schematic example of a line induced voltage in a reverse rotation direction.

In the above example, the induced voltage using the induced voltage of the minimum phase as a reference has been employed as the line induced voltage. However, the induced voltage using the induced voltage of the maximum phase as a reference may be employed. FIGS. 5 and 6 show the line induced voltages Vup and Vvp using the induced voltage of the maximum phase as a reference. However, FIG. 5 shows the line induced voltage Vup and Vvp in the forward rotation direction, and FIG. 6 shows the line induced voltages Vup and Vvp in the reverse rotation direction. As can be understood from FIGS. 5 and 6, the rotation position detector 4 determines the estimation value of the rotation position to 150 degrees when the line induced voltage Vup exceeds the line induced voltage Vvp, and determines the estimation value of the rotation position to 330 degrees when the line induced voltage Vup becomes lower than the line induced voltage Vvp.

In the exemplifications of FIGS. 5 and 6, although the line induced voltages Vup and Vvp show negative values, in order to facilitate the computation, absolute values of these values may be used.

In the following, examples using the line induced voltages Vun and Vvn will be described. However, the point that any one of the line induced voltages of two or more phases may be used, and the point that the line induced voltage using the maximum phase as a reference may be used can be applied in any one of the following aspects (including other embodiments).

<Detection of Line Induced Voltage>

In the exemplification of FIG. 1, the power converter 1 is a voltage source inverter. More specifically, the power converter 1 includes switching elements Sup, Svp, Swp, Sun, Svn, and Swn, and diodes Dup, Dvp, Dwp, Dun, Dvn, and Dwn. Switching elements Sxp and Sxn (x represents u, v, and w, hereinafter similar) are insulated-gate bipolar transistors, for example, and are connected in series to each other between the DC lines L1 and L2. Diodes Dxp and Dxn are connected parallel to the switching elements Sxp and Sxn, respectively, and have anodes at the DC line L2 side. AC lines Px are respectively connected to a point between the switching elements Sxp and Sxn.

When the switching elements Sxp and Sxn can be reversely conducted (conduction from the DC line L2 toward the DC line L1), the diodes Dxp and Dxn are not essential conditions. For example, when a MOS field-effect transistor having a parasitic diode is employed as the switching elements Sxp and Sxn, the diodes Dxp and Dxn are not necessary.

These switching elements Sxp and Sxn are controlled to be mutually exclusively conductive. This is because when both the switching elements Sxp and Sxn become conductive, the DC lines L1 and L2 are short-circuited via the switching elements Sxp and Sxn, and accordingly, a large current flows to the switching elements Sxp and Sxn. Then, when these switching elements Sxp and Sxn are properly controlled, the power converter 1 can convert the DC voltage to the AC voltage.

In the exemplification of FIG. 1, a voltage detector 3 that detects the line induced voltage is provided. The voltage detector 3 has paths 31 and 32 that connect between each of the AC lines Pu and Pv to which the induced voltages Vu and Vv are applied, respectively, and the DC line L2. The voltage detector 3 detects the voltages between each of the AC lines Pu and Pv and the DC line L2 as the line induced voltages Vun and Vvn in the paths 31 and 32. Actually, the offset based on the DC voltage described with reference to FIG. 25 is included in the detection value of the voltage detector 3. However, here, for the sake of simplicity, first, description will be made by disregarding the offset. The offset will be described later as a kind of noise.

In the state that the power converter 1 outputs the AC voltage to the AC lines Pu, Pv, and Pw by being controlled, the voltage detector 3 cannot properly detect the line induced voltages Vun and Vvn. Therefore, the voltage detector 3 detects the line induced voltage in the state that the power converter 1 does not output the AC voltage. That is, the voltage detector 3 detects the line induced voltage in the controlled state so that all the switching elements Sxp and Sxn become nonconductive.

The cause of the rotation of the motor 2 in the state that the power converter 1 does not output the AC voltage is an external force or inertia, for example. That is, even in the state that the power converter 1 does not output the AC voltage, the motor 2 can rotate by an external force, for example. Further, even when the external force disappears in the state that the motor 2 is rotating by the external force, the motor 2 keeps rotating for a while by the inertia. Alternatively, when the power converter 1 stops outputting the AC voltage from the state of outputting the AC voltage, the motor 2 keeps rotating for a while by the inertia.

In the exemplification of FIG. 1, the voltage detector 3 includes voltage-dividing resistors R11, R12, R21, and R22. The voltage-dividing resistors R11 and R12 are connected in series to each other in the path 31. The voltage-dividing resistors R21 and R22 are connected in series to each other in the path 32.

In the voltage detector 3, during the period in which the induced voltage Vw is the induced voltage of the minimum phase, the line induced voltage Vun is applied to between the AC lines Pu and Pw via the path 31, the DC line L2, and the diode Dwn. At this time, to the diode Dwn, a voltage is applied in the forward direction, and therefore, the voltage of the diode Dwn is substantially zero. Accordingly, a set of both-end voltages of the voltage-dividing resistors R11 and R12 substantially match the line induced voltage Vun which is the potential difference between the induced voltage Vu and the induced voltage Vw of the minimum phase. Similarly, a set of both-end voltages of the voltage-dividing resistors R21 and R22 substantially match the line induced voltage Vvn which is the potential difference between the induced voltage Vv and the induced voltage Vw of the minimum phase.

Further, during the period in which the induced voltage Vv is the induced voltage of the minimum phase, the line induced voltage Vun is applied to between the AC lines Pu and Pv via the path 31, the DC line L2, and the diode Dvn. At this time, to the diode Dvn, a voltage is applied to the forward direction, and therefore, the voltage of the diode Dvn is substantially zero. Accordingly, at this time, a set of both-end voltages of the voltage-dividing resistors R11 and R12 substantially match the line induced voltage Vun. On the other hand, because the potentials of the DC line L2 and the AC line Pv are mutually substantially equal, a set of both-end voltages of the voltage-dividing resistors R21 and R22 are substantially zero. In this period, because the line induced voltage Vvn is zero, a set of both-end voltages of the voltage-dividing resistors R21 and R22 substantially match the line induced voltage Vun.

During the period in which the induced voltage Vu is the induced voltage of the minimum phase, the line induced voltage Vvn is applied to between the AC lines Pu and Pv via the path 32, the DC line L2, and the diode Dun. At this time, to the diode Dun, a voltage is applied to the forward direction, and therefore, the voltage is substantially zero. Accordingly, at this time, a set of both-end voltages of the voltage-dividing resistors R21 and R22 substantially match the line induced voltage Vvn, and a set of both-end voltages of the voltage-dividing resistors R11 and R12 substantially match the line induced voltage Vun.

Therefore, the voltages applied across the voltage-dividing resistors R11 and R12 corresponds to the line induced voltage Vun, and the voltages applied across the voltage-dividing resistors R21 and R22 correspond to the line induced voltage Vvn. Accordingly, by detecting these voltages, the line induced voltages Vun and Vvn can be detected.

In the exemplification of FIG. 1, the voltage detector 3 detects the voltage Vun1 of the voltage-dividing resistor (for example, the voltage-dividing resistor R12 at the DC line L2 side) in the path 31 as the line induced voltage Vun, and detects the voltage Vun2 of the voltage-dividing resistor (for example, the voltage-dividing resistor R22 at the DC line L2 side) in the path 32 as the line induced voltage Vvn. Accordingly, by a smaller voltage value, the line induced voltages Vun and Vvn can be detected. It is desirable that the difference between the voltage-dividing ratio of the voltage-dividing resistors R11 and R12 and the voltage-dividing ratio of the voltage-dividing resistors R21 and R22 is small. This is because when these differences occur, there occurs a difference between a point in time when the magnitude 1 relation between the voltages Vun1 and Vun2 is switched and a point in time when the magnitude relation between the line induced voltages Vun and Vvn is switched.

As described above, because the voltage detector 3 has the paths 31 and 32 that connect between the DC line L2 and each of the AC lines Pu and Pv, voltages in the paths 31 and 32 can be detected as the line induced voltages Vun and Vvn.

In the case where the capacitor C is provided, it is desirable that the voltage detector 3 can detect the line induced voltage in the state that the voltage has been charged to the capacitor C. This is because when the AC lines Pu, Pv, and Pw have been short-circuited via the capacitor C and the diodes Dxp and Dxn, a current does not easily flow to the paths 31 and 32.

According to the voltage detector 3, the line induced voltages Vun and Vvn can be obtained more easily as compared with the following case, for example. That is, as compared with the case of detecting the induced voltages Vu, Vv, and Vw, extracting the induced voltage of the minimum phase from the detected induced voltages Vu, Vv, and Vw, and calculating the line induced voltages Vun and Vvn by subtracting the induced voltage of the minimum phase from the detected induced voltages Vu and Vv, the line induced voltages Vun and Vvn can be easily obtained.

In the case of employing the line induced voltages Vup and Vvp using the maximum phase as a reference, the voltage detector 3 may detect the voltage between each of the AC lines Pu and Pv and the DC line L1.

In the exemplification of FIG. 1, the voltages Vun1 and Vun2 are converted to digital signals by analog/digital converters 41 and 42, respectively, for example, and the converted signals are input to the detector 431.

<Example of Concrete Operation of Rotation Position Detector>

Figure 7:
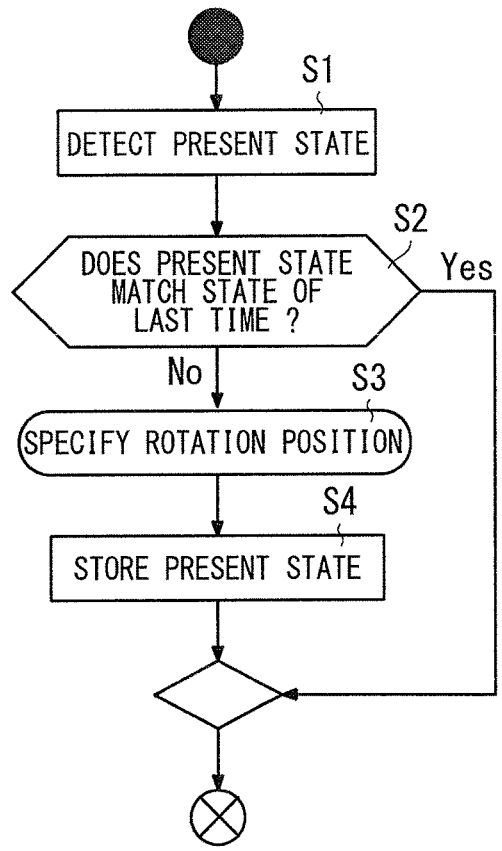
FIG. 7 is a flowchart showing an example of the operation of a rotation position detector.

FIG. 7 shows a concrete example of the operation that the rotation position detector 4 executes. A series of processing shown in FIG. 7 are executed repeatedly in each predetermined cycle (hereinafter, referred to as computation cycle). First, in Step S1, the detector 431 detects whether the present state is a state A or a state B. Here, the state A is a state in which the line induced voltage Vun (or the voltage Vun1, hereinafter similar in the present embodiment) is larger than the line induced voltage Vvn (or the voltage Vvn1, hereinafter similar in the present embodiment). Further, the state B is the state in which the line induced voltage Vun is smaller than the line induced voltage Vvn. This decision is executed based on a comparison result of the known comparing unit that compares the line induced voltages Vun and Vvn, for example.

Next, in Step S2, the detector 431 decides whether the present state matches a state of the last time. The state of the last time is the state when the estimation value of the rotation position has been determined at the last time. That is, the state of the last time is the state after the magnitude relation between the line induced voltages Vun and Vvn has been switched at the last time.

When the affirmative decision has been made in Step S2, the operation ends. That is, when the present state has not changed from the state of the last time, the operation ends by assuming that the magnitude relation between the line induced voltages Vun and Vvn has not been switched.

Figure 8:
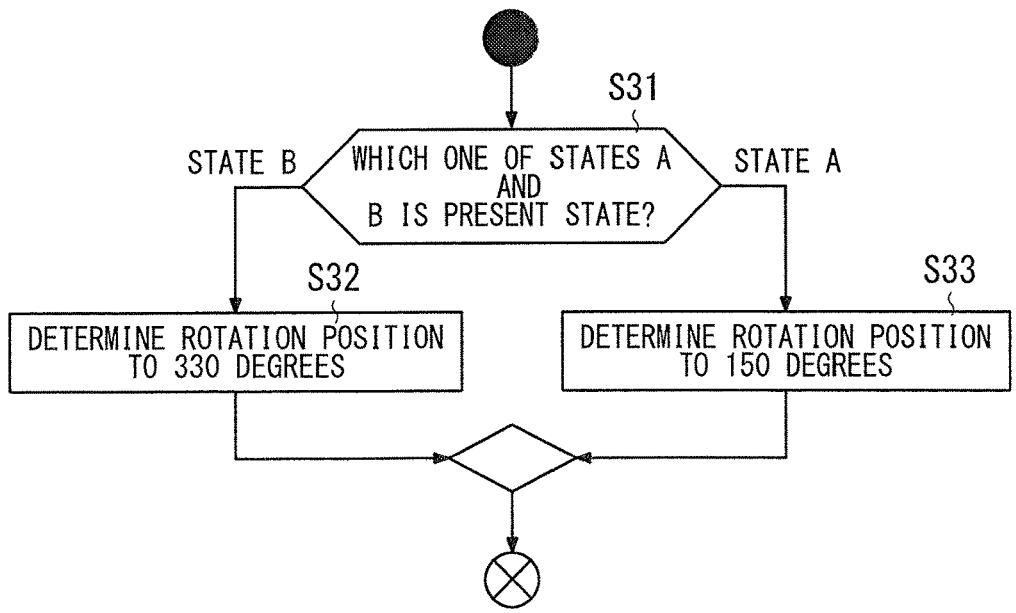
FIG. 8 is a flowchart showing an example of the operation of a rotation position detector.

On the other hand, when a negative decision has been made in Step S2, this means that the magnitude relation between the line induced voltages Vun and Vvn has been switched. Accordingly, in Step S3, the setting unit 432 determines the estimation value of the rotation position. The determination of this estimation value is executed by a series of processing shown in FIG. 8, for example.

First, in Step S31, the setting unit 432 decides whether the present state is the state A or the state B. That the present state is the state B means that the state has been switched from the state A to the state B, that is, the line induced voltage Vun has become lower than the line induced voltage Vvn. Accordingly, when it has been decided in Step S31 that the present state is the state B, the setting unit 432 determines the rotation position to 330 degrees in Step S32 (also refer to FIGS. 3 and 4). On the other hand, that the present state is the state A means that the state of large/small has been switched from the state B to the state A, that is, the line induced voltage Vun has exceeded the line induced voltage Vvn. Accordingly, when it has been decided in Step S31 that the present state is the state A, the setting unit 432 determines the rotation position to 150 degrees, for example, in Step 33 (also refer to FIGS. 3 and 4).

Referring to FIG. 7 again, in Step S4 next to Step S3, the setting unit 432 stores the present state, and ends the operation. Accordingly, in Step S2 that is executed in the next computation cycle, the present state is employed as the state of the last time.

Second Embodiment

In the second embodiment, the voltage detector 3 includes a detection-voltage limiting unit that limits the detection voltage to a predetermined value, when the line induced voltages Vun and Vvn are equal to or greater than a predetermined reference value.

Figure 9:
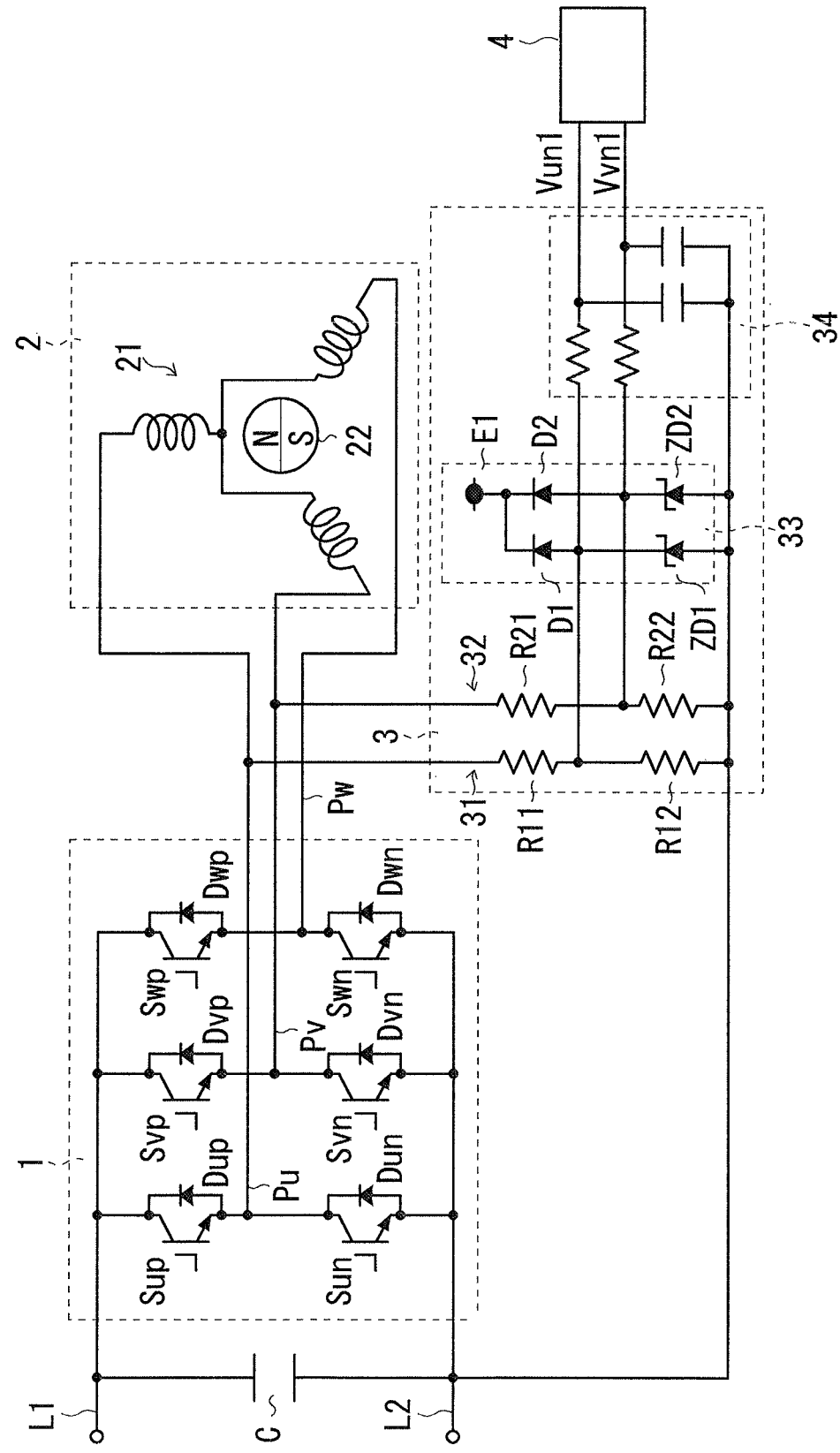
FIG. 9 is a diagram showing an example of a conceptual configuration of a motor control device.

For example, as shown in FIG. 9, the voltage detector 3 further includes a protection circuit 33 as compared with the voltage detector 3 in FIG. 1. The protection circuit 33 which is an example of the detection-voltage limiting unit outputs a voltage of a predetermined value to the rotation position detector 4 when the line induced voltages Vun and Vvn are equal to or greater than the reference value. That is, the protection circuit 33 avoids application of a voltage exceeding the predetermined value (hereinafter, also referred to as upper limit value) to the rotation position detector 4. Accordingly, the protection circuit 33 can protect the rotation position detector 4 from an excess voltage.

The protection circuit 33, for example, has diodes D1 and D2 and Zener diodes ZD1 and ZD2. The diode D1 is provided between a DC power supply E1 and a point between the voltage-dividing resistors R11 and R12, and has a cathode at the DC power supply E1 side. The diode D2 is provided between the DC power supply E1 and a point between the voltage-dividing resistors R21 and R22, and has a cathode at the DC power supply E1 side. The diodes D1 and D2 become conductive when the voltages Vun1 and Vvn1 are higher than the voltage of the DC power supply E1, and pass a current to the DC power supply E1 side. Accordingly, the voltages Vun1 and Vvn1 can be clamped to a value substantially equal to the voltage of the DC power supply E1.

The Zener diode ZD1 is connected parallel to the voltage-dividing resistor R12, and has an anode at the DC line L2 side. The Zener diode ZD2 is connected parallel to the voltage-dividing resistor R22, and has an anode at the DC line L2 side. The Zener diodes ZD1 and ZD2 become conductive when the voltage applied to each Zener diode exceeds the Zener voltage of itself, and maintains this voltages at the Zener voltage. Accordingly, the voltages Vu1 and Vvn1 can be clamped to the Zener voltage.

The Zener voltage of the Zener diodes ZD1 and ZD2 is 5 V, for example, and the voltage of the DC power supply E1 is also 5 V, for example. Accordingly, during the period in which each voltage of the voltage-dividing resistors R12 and R22 exceeds 5V due to the line induced voltages Vun and Vvn becoming equal to above the reference value, the voltages Vun1 and Vun2 are output to the rotation position detector 4 by being limited to the upper limit value. Further, it is not necessary that both the diode D1 and the Zener diode ZD1 are provided, and it is sufficient that one of these is provided. However, because the diode D1 is excellent in responsiveness, clamping can be quickly performed when the line induced voltage has exceeded the reference value. On the other hand, because the Zener diode ZD1 can pass a current to the path 31, the voltage Vun1 can be limited while passing the current to the detection path. This is similarly applied to the diode D2 and the Zener diode ZD2.

In the exemplification of FIG. 1, the filter 34 is provided. The filter 34 suppresses noise of the voltages Vun1 and Vvn1.

Figure 10:
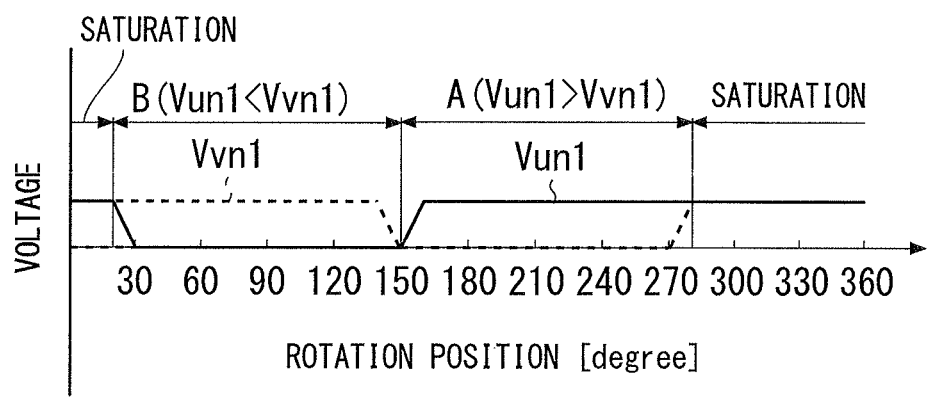
FIG. 10 is a diagram showing a schematic example of a detection voltage in a forward rotation direction.
Figure 11:
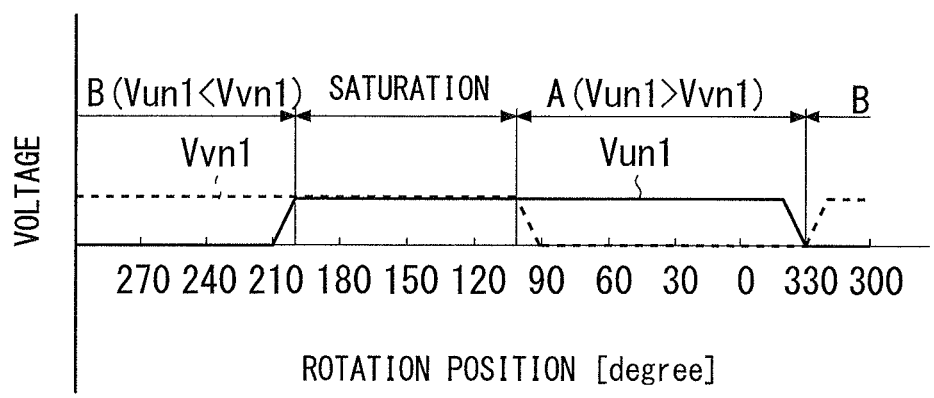
FIG. 11 is a diagram showing a schematic example of a detection voltage in a reverse rotation direction.

Waveforms of the voltages Vun1 and Vvn1 detected by the voltage detector 3 become waveforms as shown in FIGS. 10 and 11, for example. FIGS. 10 and 11 show the voltages Vun1 and Vvn1 in the case where the maximum value of the line induced voltages Vun and Vvn exceeds the reference value Vref (also refer to FIGS. 3 and 4). Further, FIG. 10 shows the voltages Vun1 and Vvn1 in the forward rotation direction, and FIG. 11 shows the voltages Vun1 and Vvn1 in the reverse rotation direction.

Referring to FIGS. 3 and 10 and FIGS. 4 and 11, during the period in which the line induced voltage Vun is zero, the voltage Vun1 is also zero. During the period when the line induced voltage Vun is zero to the reference value Vref, the voltage Vun1 takes a waveform similar to that of the line induced voltage Vun, and during the period when the line induced voltage Vun is equal to or greater than the reference value Vref, the voltage Vun1 takes the upper limit value (for example, 5 V). This is similarly applied to the voltage Vvn1.

In the voltages Vun1 and Vvn1, when the voltage Vun1 exceeds the voltage Vvn1, the line induced voltage Vun exceeds the line induced voltage Vvn (refer to FIGS. 3 and 10). Accordingly, when the voltage Vun1 exceeds the voltage Vvn1, the rotation position detector 4 determines the estimation value of the rotation position at this point in time to 150 degrees, for example. On the other hand, when the voltage Vun1 becomes lower than the voltage Vvn1, the line induced voltage Vun becomes lower than the line induced voltage Vvn (refer to FIGS. 4 and 11). Accordingly, when the voltage Vun1 becomes lower than the voltage Vvn1, the rotation position detector 4 determines the estimation value of the rotation position at this point in time to 330 degrees, for example.

Therefore, even when the present voltage detector 3 has been used, the rotation position can be properly detected without depending on the rotation direction.

Figure 12:
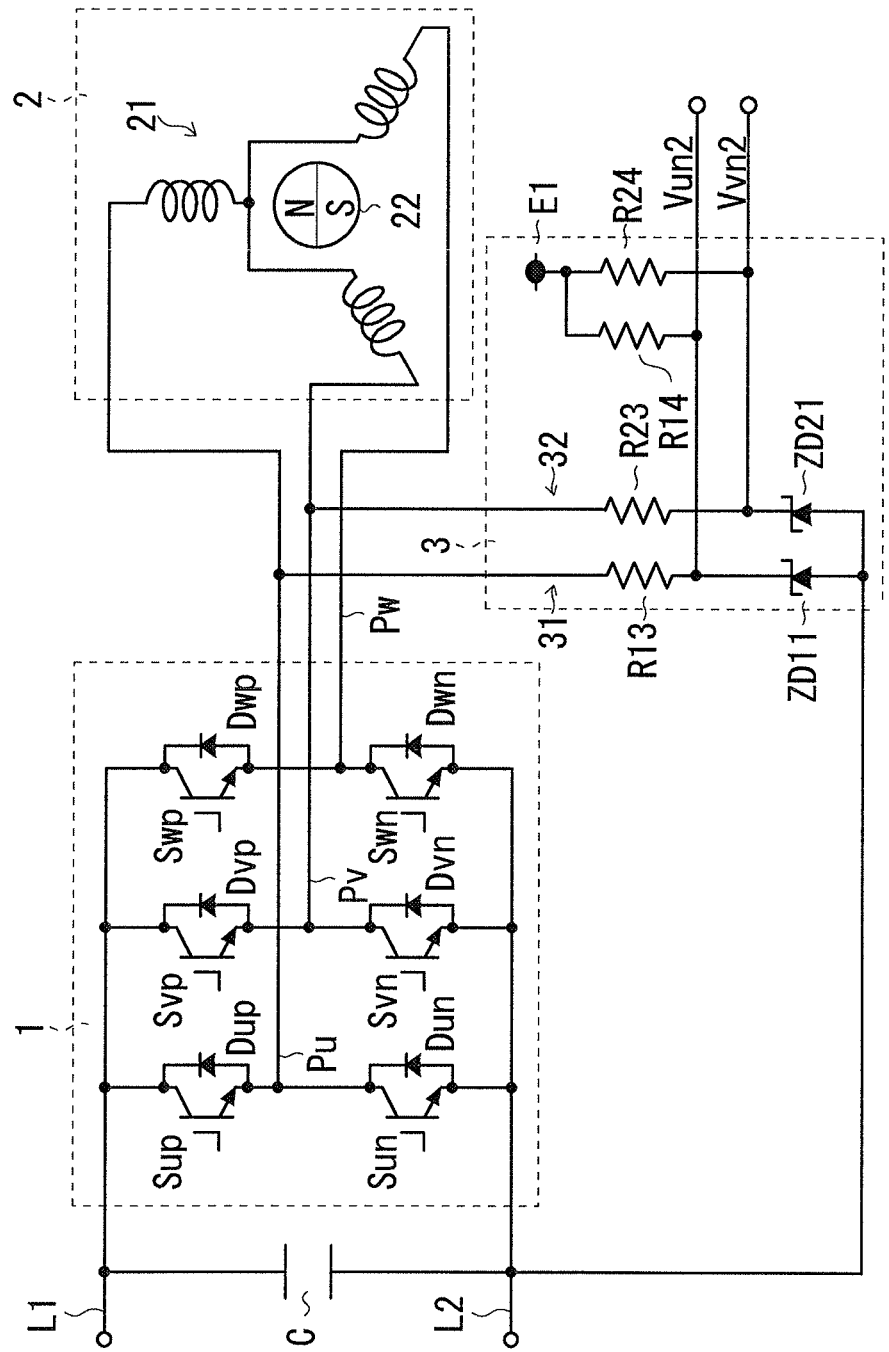
FIG. 12 is a diagram showing an example of a conceptual configuration of a motor control device.

FIG. 12 shows a conceptual configuration of other example of the voltage detector 3 according to the second embodiment. The voltage detector 3 includes voltage-dividing resistors R13, R14, R23, and R24, and Zener diodes ZD11 and ZD21.

The voltage-dividing resistor R13 and the Zener diode ZD11 are connected in series to each other in the path 31, and the voltage-dividing resistor R23 and the Zener diode ZD21 are connected in series to each other in the path 32. The Zener diodes ZD11 and ZD21 are provided at the DC line L2 side relative to the voltage-dividing resistors R13 and R23, respectively, and have anodes at the DC line L2 side. The voltage-dividing resistor R14 is provided between the DC power supply E1 and a point between the voltage-dividing resistor R13 and the Zener diode ZD11, and the voltage-dividing resistor R24 is provided between the DC power supply E1 and a point between the voltage-dividing resistor R23 and the Zener diode ZD21.

The voltage detector 3 detects the voltage Vun2 of the point between the voltage-dividing resistor R13 and the Zener diode ZD11 as the line induced voltage Vun, and detects the voltage Vvn2 of the point between the voltage-dividing resistor R23 and the Zener diode ZD21 as the line induced voltage Vvn.

In the voltage detector 3, during a period in which the Zener diodes ZD11 and ZD21 become conductive due to the line induced voltages Vun and Vvn exceeding the reference value Vref, the Zener voltage of the Zener diodes ZD11 and ZD21 is detected as the voltages Vun2 and Vvn2. That is, the Zener diodes ZD11 and ZD21 function as the detection-voltage limiting units.

On the other hand, during a period in which the Zener diodes ZD11 and ZD21 do not become conductive due to the line induced voltages Vun and Vvn becoming lower than the reference value Vref, the voltage (<Zener voltage) that has been voltage-divided by the voltage-dividing resistors R13 and R14 is detected as the voltage Vun2, and the voltage (<Zener voltage) that has been voltage-divided by the voltage-dividing resistors R23 and R24 is detected as the voltage Vvn2.

Accordingly, the voltages Vun2 and Vvn2 that are detected by the voltage detector 3 have also waveforms similar to those in FIGS. 10 and 11. However, the upper limit value of the voltages Vun2 and Vvn2 is the Zener voltage of the Zener diodes ZD11 and ZD21, and the lower limit value is the voltage that is voltage-divided by the voltage-dividing resistors R13, R14, R23, and R24.

However, even when there is such a difference, the rotation position when the voltage Vun2 exceeds the voltage Vvn2 is 150 degrees that is the same as the rotation position when the line induced voltage Vun exceeds the line induced voltage Vvn. Similarly, the rotation position when the voltage Vun2 becomes lower than the voltage Vvn2 is 330 degrees that is the same as the rotation position when the line induced voltage Vun becomes lower than the line induced voltage Vvn. Accordingly, when the voltage Vun2 exceeds the voltage Vvn2, the rotation position detector 4 determines the estimation value of the rotation position to 150 degrees, and when the voltage Vun2 becomes lower than the voltage Vvn2, the rotation position detector 4 determines the estimation value of the rotation position to 330 degrees.

As described above, even when the maximum value of the line induced voltages Vun and Vvn is larger than the reference value Vref, it is possible to prevent application of an excess voltage to the rotation position detector 4, and further, the rotation position can be detected without depending on the rotation direction.

In the case of employing the voltage detector 3 of FIG. 9, the voltage-dividing ratio (=R12/(R11+R12)) of the voltage-dividing resistors R11 and R12 and the voltage-dividing ratio (=R22/(R21+R22)) of the voltage-dividing resistors R21 and R22 can be enhanced. This is because even when the voltages Vun1 and Vvn1 have increased, because the maximum value is the upper limit value determined by the protection circuit 33, the rotation position can be detected while protecting the rotation position detector 4. When the voltage-dividing ratio has been enhanced, even when the rotation speed of the motor 2 is low and the maximum value of the line induced voltages Vun and Vvn is small, the voltages Vun1 and Vvn1 can be enhanced. When the voltages Vun1 and Vvn1 are small, the influence of noise is easily received. However, because the voltages Vun1 and Vvn1 can be enhanced, the estimation accuracy of the rotation position when the rotation speed is low can be enhanced.

<Example of Concrete Operation of Rotation Position Detector>

Figure 13:
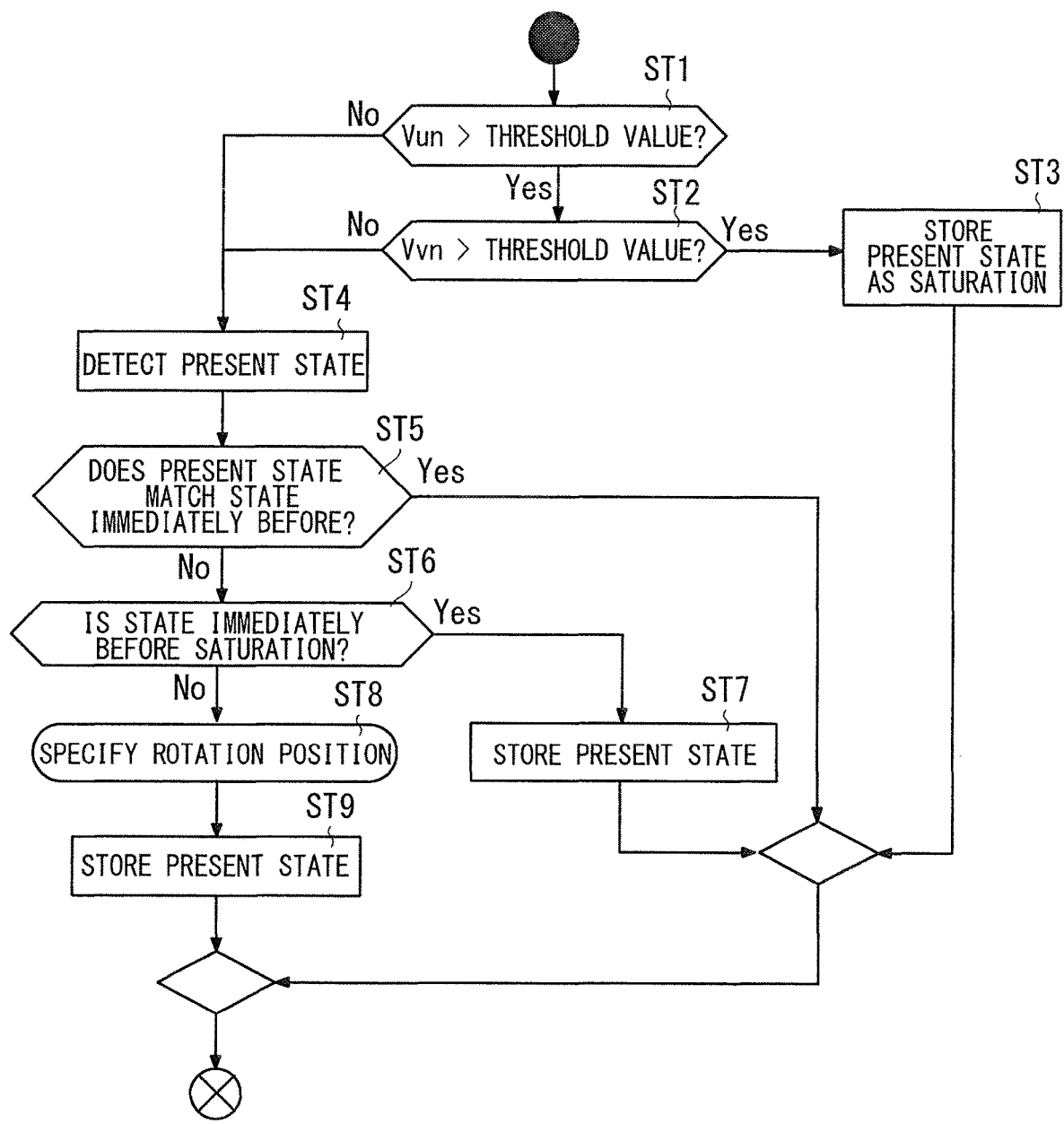
FIG. 13 is a flowchart showing an example of the operation of a rotation position detector.

FIG. 13 is a concrete example of the operation that the rotation position detector 4 executes. The series of processing are executed repeatedly in each computation cycle, for example. First, the detector 431 decides in Step ST1 whether the voltage Vun1 (or the voltage Vun2, hereinafter similar) is larger than the threshold value. This threshold value is set in advance, and is set to a slightly smaller value than the upper limit value, for example. When an affirmative decision has been made, the detector 431 decides in Step ST2 whether the voltage Vvn1 (or the voltage Vvn2, hereinafter similar) is larger than the threshold value.

When an affirmative decision has been made in Step ST2, the rotation position detector 4 stores the present state as a saturation state in Step ST3, and ends the operation. In the saturation period (also refer to FIGS. 10 and 11) when both the voltages Vun1 and Vvn1 take the upper limit value, the magnitude relation between the voltages Vun1 and Vvn1 is not switched. Accordingly, when the present state is the saturation state, the operation ends without execution of the steps described later. Consequently, the number of processing can be reduced.

In Step ST1 or Step ST2, when a negative decision has been made, the detector 431 detects in Step ST4 the present state. In both Steps ST1 and ST2, because a negative decision has been made, the present state is one of the states A and B. Next in Step ST5, the detector 431 decides whether the present state matches the present state in the computation cycle immediately before.

When an affirmative decision has been made in Step ST5, the operation ends. That is, when the present state coincides with the state of the computation cycle immediately before, the operation ends on the assumption that the magnitude relation between the voltages Vun1 and Vvn1 has not been switched. On the other hand, when a negative decision has been made in Step ST5, the detector 431 decides in Step ST6 whether the present state in the computation cycle immediately before is the saturation state. When an affirmative decision has been made, the detector 431 stores the present state (one of the states A and B) in Step ST7, and ends the operation. That is, when the present state immediately before is the saturation state, by assuming that the magnitude relation between the voltages Vun1 and Vvn1 has not been switched, the present state is updated and the operation ends.

When a negative decision has been made in Step ST6, the setting unit 432 determines the estimation value of the rotation position in Step ST8. The determination of the estimation value is executed by the series of processing shown in FIG. 8, for example. Next, the setting unit 432 stores the present state (one of the states A and B) in Step ST9, and ends the operation.

In the first period in which one of the voltages Vun1 and Vvn1 takes the upper limit value, similarly to the saturation period, the magnitude relation between the voltages Vun1 and Vvn1 is not switched (also refer to FIG. 10). Accordingly, also in the first period, Step ST3 may be executed without executing Steps ST4 to ST7. That is, Steps ST4 and ST7 may be executed in only the second period in which none of the voltages Vun2 and Vvn2 take the upper limit value. However, in the case where the second period is shorter than the computation cycle, for example, the rotation position detector 4 cannot operate at a plurality of times in the second period, and cannot properly detect the magnitude relation between the voltages Vun1 and Vvn1. On the other hand, according to the operation in FIG. 13, even when the second period is shorter than the computation cycle, when the sum of the first period and the second period is sufficiently longer than the computation cycle, switching of the magnitude relation between the voltages Vun1 and Vvn1 can be detected. Accordingly, the computation cycle does not need to be set shorter than the second period, and a low-cost processing device having a slow processing speed can be employed for the rotation position detector 4.

Third Embodiment

Figure 14:
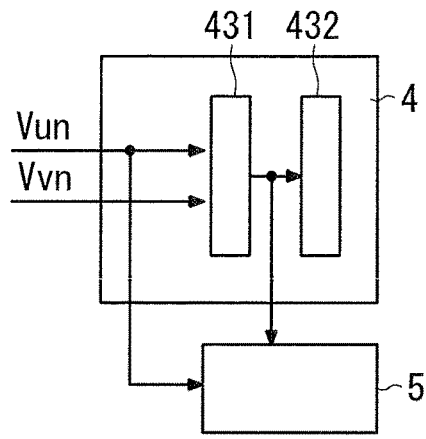
FIG. 14 is a diagram showing an example of a conceptual configuration of a rotation position detector and a rotation-direction specifying unit.

In the third embodiment, the rotation direction can be specified. As a point different from the first embodiment, the present motor driving device is further provided with a rotation-direction specifying unit 5 shown in FIG. 14. The rotation-direction specifying unit 5 receives from the detector 431 that the line induced voltages match each other, and further receives at least one of the line induced voltages Vun and Vvn.

The rotation-direction specifying unit 5 specifies a rotation direction as a predetermined direction based on at least one of values of the line induced voltages Vun and Vvn when the line induced voltages Vun and Vvn match each other. This will be described in detail.

As shown in FIG. 3, in the forward rotation direction, the line induced voltages Vun and Vvn when the line induced voltage Vun exceeds the line induced voltage Vvn (when the rotation position is 150 degrees) take a relatively small value (for example, zero). Hereinafter, the line induced voltages Vun and Vvn when the line induced voltage Vun exceeds the line induced voltage Vvn will be referred to as line induced voltages VunK and VvnK, respectively. Further, as exemplified in FIG. 4, in the reverse rotation direction, the line induced voltages VunK and VvnK take relatively large values.

That is, while the rotation position when the line induced voltage Vun exceeds the line induced voltage Vvn takes a predetermined value (for example, 150 degrees) without depending on the rotation direction, values of the line induced voltages VunK and VvnK at this time are different depending on the rotation direction. Therefore, the rotation-direction specifying unit 5 specifies the rotation direction based on the line induced voltages VunK and VvnK.

Further, as shown in FIG. 3, in the forward rotation direction, the line induced voltages Vun and Vvn when the line induced voltage Vun becomes lower than the line induced voltage Vvn (when the rotation position is 330 degrees) take relatively large values. Hereinafter, the line induced voltages Vun and Vvn when the line induced voltage Vun becomes lower than the line induced voltage Vvn will be referred to as line induced voltages VunL and VvnL, respectively. Further, as exemplified in FIG. 4, in the reverse rotation direction, the line induced voltages VunL and VvnL take relatively small values (for example, zero).

That is, while the rotation position when the line induced voltage Vun becomes lower than the line induced voltage Vvn takes a predetermined value (for example, 330 degrees) without depending on the rotation direction, values of the line induced voltages VunL and VvnL at this time are different depending on the rotation direction. Therefore, the rotation-direction specifying unit 5 may specify the rotation direction based on the line induced voltages VunL and VvnL, in place of the line induced voltages VunK and VvnK, or together with the line induced voltages VunK and VvnK.

<First Concrete Example of Specifying Method of Rotation Direction>

When the line induced voltage Vun has exceeded the line induced voltage Vvn, the rotation-direction specifying unit 5 compares the line induced voltage VunK (or the line induced voltage VvnK, hereinafter similar) and a predetermined threshold value. The predetermined threshold value is a value larger than the minimum value (substantially zero) of the line induced voltages Vun and Vvn, for example. Then, when the line induced voltage VunK is larger than the predetermined threshold value, the rotation-direction specifying unit 5 specifies the rotation direction as a predetermined direction (reverse rotation direction in this case) as the rotation direction when the line induced voltage VunK is larger than the threshold value, and when the line induced voltage VunK is smaller than the threshold value, the rotation-direction specifying unit 5 specifies the rotation direction as the opposite direction (forward rotation direction in this case). When the threshold value is set closer to the minimum value, even when the maximum value of the line induced voltage Vun is small (that is, the rotation speed is small), the rotation direction can be specified.

Alternatively, when the line induced voltage Vun has become lower than the line induced voltage Vvn, the rotation-direction specifying unit 5 may compare the line induced voltage VunL (or the line induced voltage VvnL, hereinafter similar) and the predetermined threshold value. Then, when the line induced voltage VunL is larger than the predetermined threshold value, the rotation-direction specifying unit 5 specifies the rotation direction as the forward rotation direction, and when the line induced voltage VunL is smaller than the threshold value, the rotation-direction specifying unit 5 specifies the rotation direction as the reverse rotation direction.

<Second Concrete Example of Specifying Method of Rotation Direction>

In the forward rotation direction as shown in FIG. 3, the line induced voltages VunK and VvnK are smaller than the line induced voltages VunL and VvnL. Further, in the reverse rotation direction as shown in FIG. 4, the line induced voltages VunK and VvnK are larger than the line induced voltages VunL and VvnL.

The rotation-direction specifying unit 5 may specify the rotation direction based on the magnitude relation between the line induced voltages VunK and VunL, or the magnitude relation between the line induced voltages VvnK and VvnL.

More specifically, when the line induced voltage VunK is smaller than the line induced voltage VunL, for example, the rotation-direction specifying unit 5 specifies the rotation direction as a direction determined in advance (forward rotation direction in this case) corresponding to the fact that the line induced voltage VunK is smaller than the line induced voltage VunL. When the line induced voltage VunK is larger than the line induced voltage VunL, the rotation-direction specifying unit 5 specifies the rotation direction as a direction determined in advance (reverse rotation direction in this case) corresponding to the fact that the line induced voltage VunK is larger than the line induced voltage VunL. In the case of using the line induced voltages VvnK and VvnL, this is similarly applied.

According to the specifying method of the rotation direction as described above, the threshold value does not need to be set in advance. In the first concrete example, when the rotation speed is low and the maximum value of the line induced voltages Vun and Vvn becomes lower than the threshold value, the rotation direction cannot be specified properly. In the second concrete example, such a situation can be avoided.

<Computation of Line Induced Voltage>

In the second concrete example, comparison between the line induced voltages VunK and VunL is performed. In this case, a computation result obtained by adding or multiplying the line induced voltages VunK and VvnK is compared with the computation result of the line induced voltages VunL and VvnL.

Figure 15:
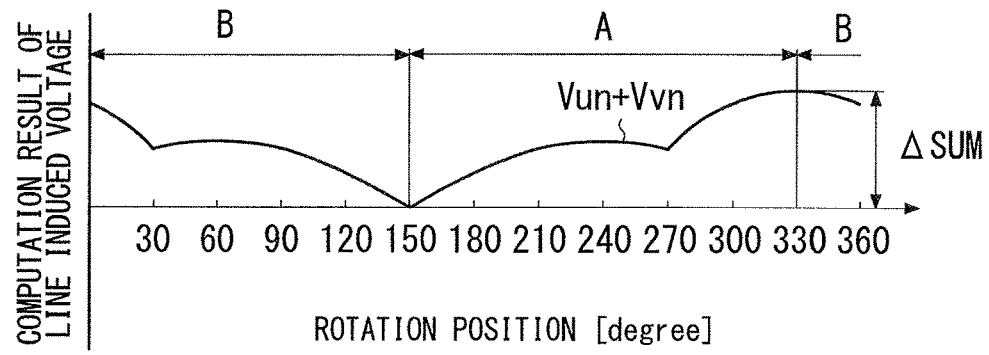
FIG. 15 is a diagram showing a schematic example of a computational result of a line induced voltage.
Figure 16:
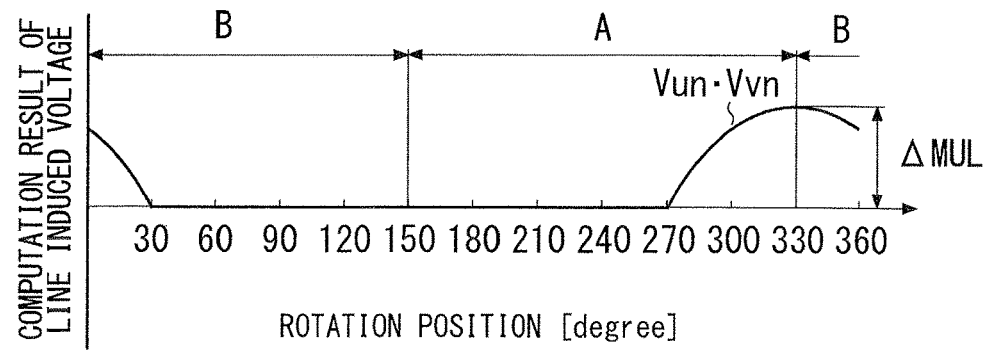
FIG. 16 is a diagram showing a schematic example of a computational result of a line induced voltage.

FIG. 15 shows a computation result obtained by adding the line induced voltages Vun and Vvn in the forward rotation direction, and FIG. 16 shows a computation result obtained by multiplying the line induced voltages Vun and Vvn in the forward rotation direction. The computation is not limited to only addition or multiplication, and may uses both addition and multiplication, and may further use addition or multiplication of arbitrary parameters.

As can be understood from FIG. 15, in the forward rotation direction, the sum of the line induced voltages VunK and VvnK may be smaller than the sum of the line induced voltages VunL and VvnL. This is because in the forward rotation direction, the line induced voltages VunK and VvnK are smaller than the line induced voltages VunL and VvnL, respectively. On the other hand, in the reverse rotation direction, because the line induced voltages VunK and VvnK are larger than the line induced voltages VunL and VvnL, respectively (refer to FIG. 4), the sum (VunK+VvnK) is larger than the sum (VunL+VvnL). Therefore, when the sum (VunK+VvnK) is smaller than the sum (VunL+VvnL), the rotation-direction specifying unit 5 specifies the rotation direction as the forward rotation direction, and when the sum (VunK+VvnK) is larger than the sum (VunL+VvnL), the rotation-direction specifying unit 5 specifies the rotation direction as the reverse rotation direction.

Further, as can be understood from FIG. 16, in the forward rotation direction, the product of the line induced voltages VunK and VvnK is smaller than the product of the line induced voltages VunL and VvnL. On the other hand, in the reverse rotation direction, the product (VunK·VvnK) is larger than the product (VunL·VvnL). Therefore, when the product (VunK·VvnK) is smaller than the product (VunL·VvnL), the rotation-direction specifying unit 5 may specify the rotation direction as the forward rotation direction, and when the product (VunK·VvnK) is larger than the product (VunL·VvnL), the rotation-direction specifying unit 5 may specify the rotation direction as the reverse rotation direction.

When the rotation speed of the motor 2 is small, the maximum value of the line induced voltages Vun and Vvn is small. Accordingly, in this case, the difference ΔV of the line induced voltages VunK and VunL (refer to FIGS. 3 and 4) is also small. Therefore, an error easily occurs in the comparison between the line induced voltages VunK and VvnL. On the other hand, according to the present rotation-direction specifying unit 5, an error hardly occurs in the comparison result. This is because the difference ΔSUM between the sum of the line induced voltages VunK and VvnK and the sum of the line induced voltages VunL and VvnL is larger than the difference ΔV between the line induced voltages VunK and VunL, and the difference ΔMUL between the product of the line induced voltages VunK and VvnK and the product of the line induced voltages VunL and VvnL is also larger than the difference ΔV between the line induced voltages VunK and VunL.

Therefore, as compared with the case of comparing between the line induced voltages VunK and VunL, an error occurs hardly in the comparison result.

<Example of Concrete Operation about Second Concrete Example>

Figure 17:
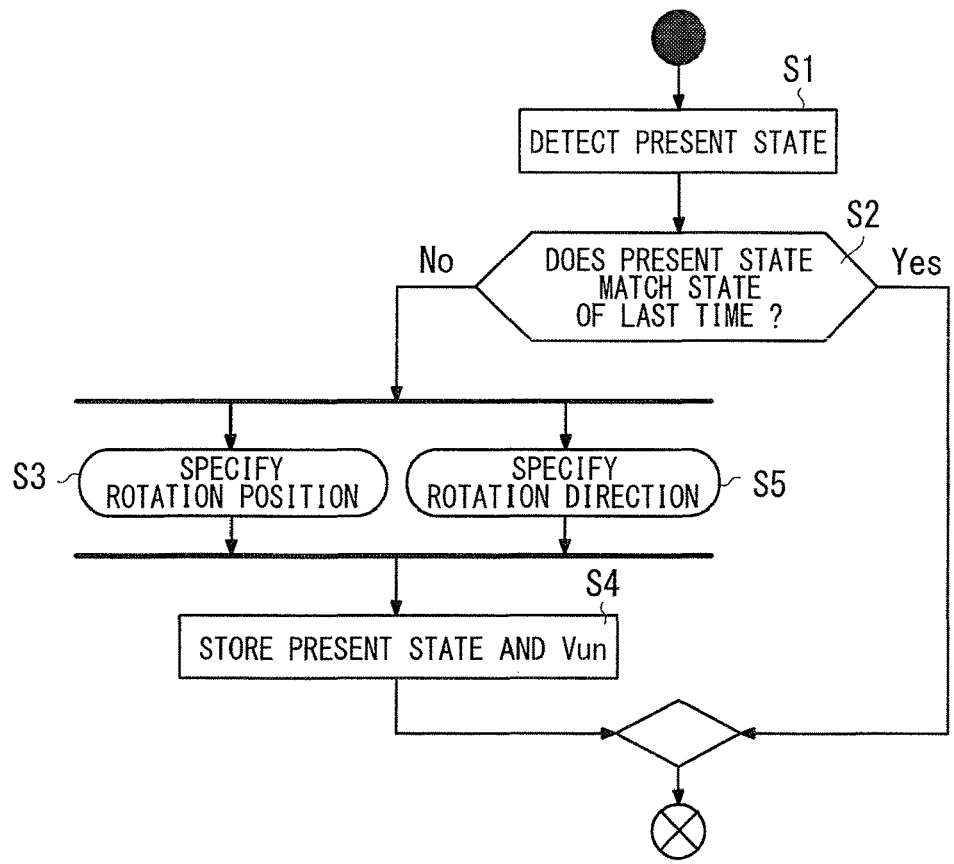
FIG. 17 is a flowchart showing an example of the operation of a rotation position detector and a rotation-direction specifying unit.

FIG. 17 shows a concrete example of the operation that the rotation position detector 4 and the rotation-direction specifying unit 5 execute. A series of processing in FIG. 17 are executed repeatedly in each computation cycle. In the series of processing, Step S5 is added as compared with the series of processing in FIG. 7. Further, in Step S4, addition to the present state, the line induced voltage Vun is recorded.

Figure 18:
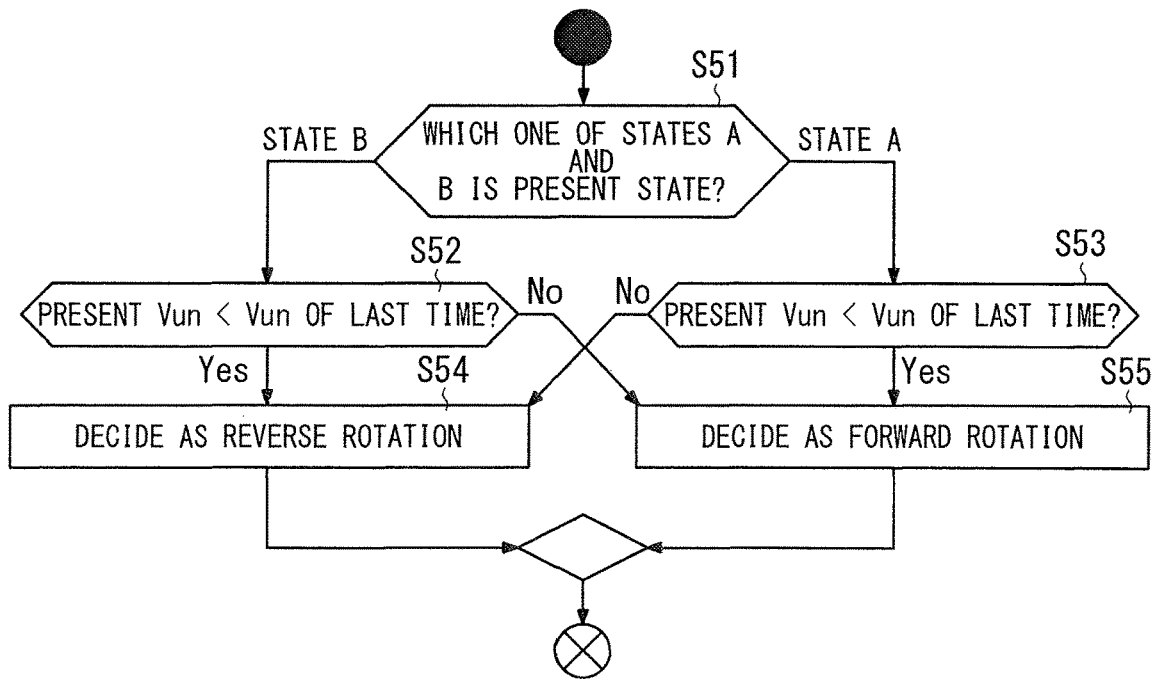
FIG. 18 is a flowchart showing an example of the operation of a rotation-direction specifying unit.

Step S5 is executed when a negative decision has been made in Step S2, that is, when the magnitude relation between the line induced voltages Vun and Vvn has been switched. Step S5 is executed before or after Step 3 or in parallel to Step S3. In Step S5, the rotation-direction specifying unit 5 specifies the rotation direction. An example of a concrete operation is as shown in FIG. 18. In Step S51, the rotation-direction specifying unit 5 decides which one of the states A and B is the present state. When it has been decided in Step S51 that the present state is the state B, the rotation-direction specifying unit 5 decides in Step S52 whether the present line induced voltage Vun VunL) is smaller than the line induced voltage Vun VunK) of the last time. When an affirmative decision has been made, the rotation-direction specifying unit 5 specifies in Step S54 that the rotation direction is the reverse rotation direction. When a negative decision has been made, the rotation-direction specifying unit 5 specifies in Step S55 that the rotation direction is the forward rotation direction.

When it has been decided in Step S51 that the present state is the state A, the rotation-direction specifying unit 5 decides in Step S53 whether the present line induced voltage Vun (≈VunK) is smaller than the line induced voltage Vun VunK) of the last time. When an affirmative decision has been made, Step S55 is executed, and when a negative decision has been made, Step S54 is executed.

Fourth Embodiment

The rotation direction is also specified in the fourth embodiment. As a point different from the second embodiment, the present motor driving device is further provided with a rotation-direction specifying unit 5 exemplified in FIG. 14. However, as shown in FIGS. 10 and 11, a case where the upper limit value is detected as the voltages Vun1 and Vvn1 (or voltages Vun2 and Vvn2, similar in the present embodiment) will be considered. Accordingly, to the rotation-direction specifying unit 5, the voltages Vun1 and Vvn1 are input as the line induced voltages Vun and Vvn.

<Third Concrete Example of Specifying Method of Rotation Direction>

As shown in FIG. 10, in the forward rotation direction, although there is a case where the voltage Vun1 exceeds the voltage Vvn1, there is no time when the voltage Vun1 becomes lower than the voltage Vvn1. More specifically, although there occurs a switching from the state B (Vun1<Vvn1) to the state A (Vun1>Vvn1), no switching occurs from the state A to the state B. Therefore, when a phenomenon that the voltage Vun1 exceeds the voltage Vvn1 to switch the magnitude relation occurs at least twice in succession, the rotation-direction specifying unit 5 specifies the rotation direction as a direction determined in advance (forward rotation direction in this case) corresponding to the fact that the voltage Vun1 exceeds the voltage Vvn1 in succession.

Further, in the reverse rotation direction as shown in FIG. 11, although there is time when the voltage Vun1 becomes lower than the voltage Vvn1, there is no time when the voltage Vun1 exceeds the voltage Vvn1. That is, although there occurs a switching from the state A to the state B, there does not occur a reverse switching. Therefore, when a phenomenon that the voltage Vun1 becomes lower than the voltage Vvn1 to switch the magnitude relation occurs at least twice in succession, the rotation-direction specifying unit 5 specifies the rotation direction as a direction determined in advance (reverse rotation direction in this case) corresponding to the fact that the voltage Vun1 becomes lower than the voltage Vvn1 in succession.

<Fourth Concrete Example of Specifying Method of Rotation Direction>

In the forward rotation direction as described above, when the voltages Vun1 and Vvn1 are limited to the upper limit values, there occurs only the switching from the state B to the state A. Accordingly, when the voltage Vun1 or the voltage Vvn1 has taken the upper limit value and also when the voltage Vun1 has exceeded the voltage Vvn1, the rotation-direction specifying unit 5 specifies the rotation direction as a direction determined in advance (forward rotation direction in this case) corresponding to this.

More specifically, the rotation-direction specifying unit 5 decides whether the voltages Vun1 and Vvn1 take the upper limit values, and when an affirmative decision has been made, the rotation-direction specifying unit 5 activates a predetermined flag and records this. When the voltage Vun1 has exceeded the voltage Vvn1 in the state that this flag is being activated, the rotation-direction specifying unit 5 specifies the rotation direction as the forward rotation direction.

Further, as described above, in the reverse rotation direction, in the case where the voltages Vun1 and Vvn1 are limited to the upper limit values, there occurs only the switching from the state A to the state B. Accordingly, when the voltage Vun1 or the voltage Vvn1 has taken the upper limit value and also when the voltage Vun1 has become lower than the voltage Vvn1, the rotation-direction specifying unit 5 specifies the rotation direction as a direction determined in advance (reverse rotation direction in this case) corresponding to this.

More specifically, the rotation-direction specifying unit 5 decides whether the voltages Vun1 and Vvn1 take the upper limit values, and when an affirmative decision has been made, the rotation-direction specifying unit 5 activates a predetermined flag and records this. In the state that this flag is being activated, when the voltage Vun1 has become lower than the voltage Vvn1, the rotation direction is specified as the reverse rotation direction.

<Fifth Concrete Example of Specifying Method of Rotation Direction>

As shown in FIGS. 10 and 11, the order in which the state respectively becomes the saturation state, the state A, and the state B is different depending on the rotation direction. That is, in the forward rotation direction, the state B, the state A, and the saturation state appear in this order, and in the reverse rotation direction, the state A, the state B, and the saturation state appear in this order. Therefore, in the case where the voltages Vun1 and Vvn1 have once taken the upper limit values, the rotation-direction specifying unit 5 can specify the rotation direction based on the change of the state. By detecting that one of the voltages Vun1 and Vvn1 has taken the upper limit value, this fact is recorded as a flag. In the state that the flag is being recorded, when it has been detected, for example, that the state changed from the saturation state to the state B, that the state changed from the state B to the state A, or that the state changed from the state A to the saturation state, the rotation direction is specified as the forward rotation direction. Further, in the state that the flag has been recorded, when it has been detected that the state changed from the saturation state to the state A, that the state changed from the state A to the state B, or that the state changed from the state B to the saturation state, the rotation direction can be specified as the reverse rotation direction.

Further, by detecting the occurrence order of the state A, the state B, and the saturation state, the rotation direction may be specified. For example, when it has been detected that the state A, the state B, and the saturation state appeared repeatedly in this order, the rotation direction may be specified as the reverse rotation direction. Similarly, for example, when it has been detected that the state B, the state A, and the saturation state appeared repeatedly in this order, the rotation direction may be specified as the forward rotation direction.

<Example of Concrete Operation of Rotation Position Detector and Rotation-Direction Specifying Unit in Third Concrete Example>

Figure 19:
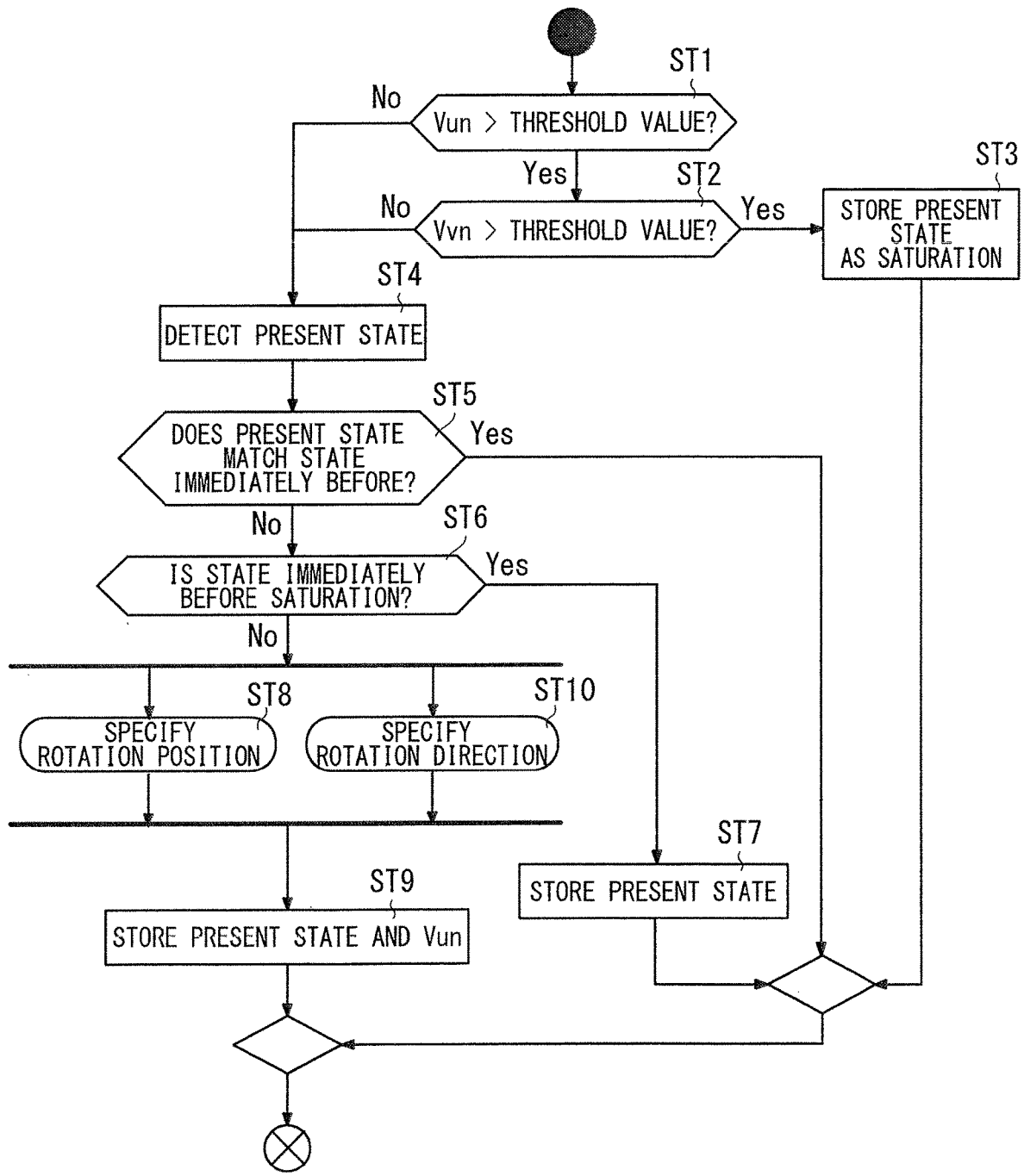
FIG. 19 is a flowchart showing an example of the operation of a rotation position detector and a rotation-direction specifying unit.

FIG. 19 is a concrete example of the operation that the rotation position detector 4 and the rotation-direction specifying unit 5 execute. The series of processing are an example of the operation when the voltage detector 3 in FIG. 9 has been employed. As compared with the flow in FIG. 13, Step ST10 is added. Further, in Step ST9, in addition to the present state, the line induced voltage Vun is recorded.

Figure 20:
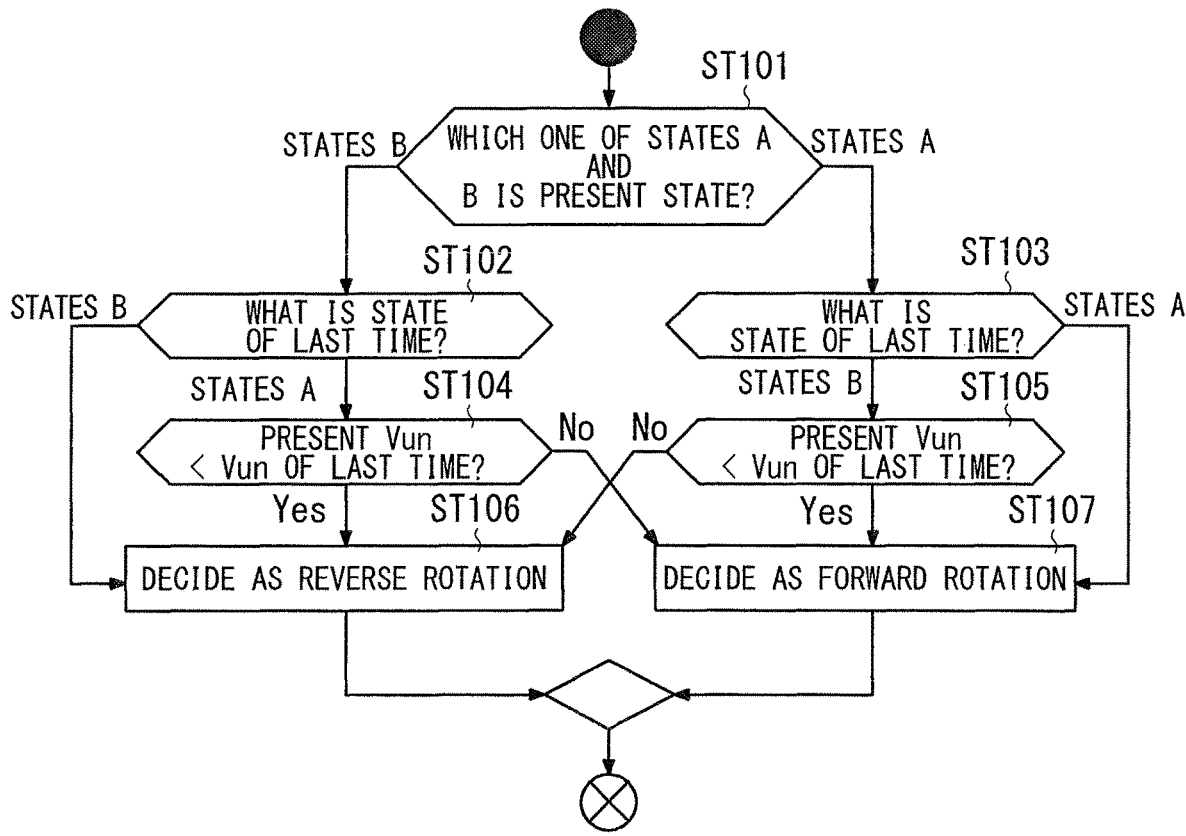
FIG. 20 is a flowchart showing an example of the operation of a rotation-direction specifying unit.

Step ST10 is executed when a negative decision has been made in Step ST6, that is, when the magnitude relation between the voltages Vun1 and Vvn1 has been switched. Step ST10 is executed before or after Step ST8 or in parallel to Step ST8. In Step ST10, the rotation-direction specifying unit 5 specifies the rotation direction. An example of a concrete operation is as shown in FIG. 20. Because Steps ST101, and ST104 to ST107 are the same as Steps S51 to S55 in FIG. 18, repeated description will be avoided.

Step ST102 is executed when the present state has been decided as the state B (Vun1<Vvn1) in Step ST101. In Step ST102, the rotation-direction specifying unit 5 decides which one of the states A and B is the present state of the last time. When it has been decided that the state of the last time was the state B (that is, the same as the present state), the rotation-direction specifying unit 5 decides in Step ST106 that the rotation direction is the reverse rotation direction. That is, based on the fact that the switching from the state A to the state B occurs in succession, the rotation-direction specifying unit 5 decides that the rotation direction is the reverse rotation direction.

When it has been decided in Step ST102 that the state of the last time was the state A, that is, the state is different from the present state, the rotation-direction specifying unit 5 executes Step ST104. That is, in the case where both the switching from the state A to the state B and the switching from the state B to the state A occur, by assuming that the voltage Vun1 does not take the upper limit value, the rotation-direction specifying unit 5 specifies the rotation direction by executing the same processing as that in the third embodiment.

Step ST103 is executed when it has been decided in Step ST101 that the present state is the state A. In Step ST103, the rotation-direction specifying unit 5 decides which one of the states A and B is the state of the last time. When it has been decided that the state of the last time was the state A (that is, the same as the present state), the rotation-direction specifying unit 5 decides in Step ST107 that the rotation direction is the forward rotation direction. That is, based on the fact that the switching from the state B to the state A occurs in succession, the rotation-direction specifying unit 5 decides that the rotation direction is the forward rotation direction.

When it has been decided in Step ST103 that the state of the last time was the state B (that is, different from the present state), the rotation-direction specifying unit 5 executes Step ST105. That is, like in Step ST102, when there occur both the switching from the state B to the state A and the switching from the state A to the state B, by assuming that the voltage Vun1 does not take the upper limit value, the rotation-direction specifying unit 5 specifies the rotation direction by executing the same processing as that of the third embodiment.

Fifth Embodiment

The rotation direction is also specified in the fifth embodiment. As a point different from the first or second embodiment, the present motor driving device is further provided with a rotation-direction specifying unit 5 shown in FIG. 13.

In the fifth embodiment, the rotation-direction specifying unit 5 generates a waveform similar to that of the line induced voltage when the rotation direction is the forward rotation direction (hereinafter, referred to as forward-rotation estimation waveform), and calculates forward-rotation similarity between the forward-rotation estimation waveform and the detected line induced voltage. Then, the rotation-direction specifying unit 5 specifies the rotation direction based on the forward-rotation similarity. When the forward-rotation similarity is higher than the predetermined value, for example, the rotation-direction specifying unit 5 specifies the rotation direction as the forward rotation direction, and when the forward-rotation similarity is smaller than the predetermined value, the rotation-direction specifying unit 5 specifies the rotation direction as the reverse rotation direction.

The forward-rotation estimation waveform is an ideal line induced voltage, for example, and is as exemplified in FIG. 3. A shape (excluding amplitude, cycle, and phase) of the forward-rotation estimation waveform is recorded in advance in a recording medium not shown, for example. Accordingly, when it is possible to detect the amplitude, phase, and cycle of the line induced voltage, the forward-rotation estimation waveform can be generated based on the shape recorded in the recording medium.

The amplitude, phase, and cycle of the line induced voltage are obtained as follows. Out of a plurality of points in time when the magnitude relation between the line induced voltages Vun and Vvn is switched as described above, adjacent two take 150 degrees and 330 degrees, respectively. Accordingly, based on the plurality of points in time, information of cycle and phase can be obtained. Further, the amplitude can be obtained as a maximum value of the detected line induced voltages, for example. Alternatively, the amplitude can be obtained by a known expression based on the cycle and the device constant of the motor 2. Therefore, the rotation-direction specifying unit 5 can generate a forward-rotation estimation waveform from the shape recorded in the recording medium, and the information of the amplitude, cycle, and phase. The forward-rotation estimation waveform may be expressed by a function.

Then, the rotation-direction specifying unit 5 calculates the forward-rotation similarity. An evaluation function A1 regarding the forward-rotation similarity can employ any one of the following expressions, for example.

$$A1 = \int |Vun - Vun\_N| dt \tag{1}$$

$$A1 = \int (Vun - Vun\_N)^2 dt \tag{2}$$

Where, Vun_N is the forward-rotation estimation waveform regarding the line induced voltage Vun. Although the evaluation function A1 of the line induced voltage Vun is used in this case, the evaluation function A1 may be employed based on the forward-rotation estimation waveform of the line induced voltage Vvn and the detected line induced voltage Vvn.

Although an arbitrary period can be employed for the integration period, a value according to the cycle of the line induced voltage Vun (for example, one cycle, half cycle, and double cycle) can be employed. Such a value can be determined based on the cycle obtained as described above. Alternatively, a period from when the magnitude relation between the line induced voltages Vun and Vvn has been switched to when the magnitude relation is switched next may be employed as the integration period, for example. Alternatively, a period determined in advance may be employed as the integration period. In determining the integration period in advance, it is desirable to determine, by considering a range that the rotation speed of the motor 2 (cycle of the line induced voltage) can take.

Such an evaluation function A1 takes a smaller value when the detected line induced voltage Vun is nearer the forward-rotation estimation waveform Vun_N. Accordingly, when the evaluation function A1 is smaller than the predetermined value, that is, when the forward-rotation similarity is higher than the predetermined value, the rotation-direction specifying unit 5 specifies the rotation direction as the forward rotation direction. Further, when the evaluation function A1 is higher than the predetermined value, that is, when the forward-rotation similarity is lower than the predetermined value, the rotation-direction specifying unit 5 specifies the rotation direction as the reverse rotation direction.

Figure 21:
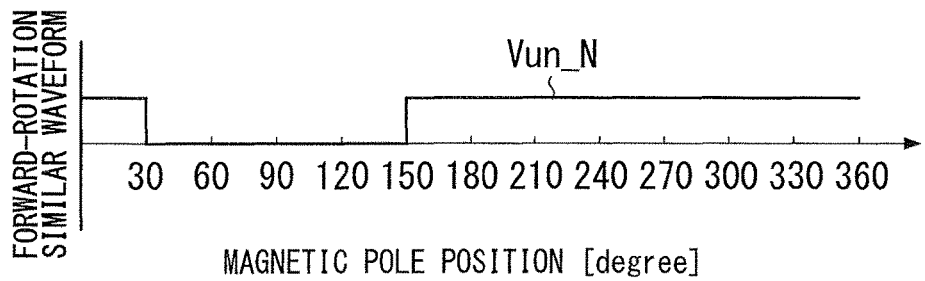
FIG. 21 is a diagram showing a schematic example of an estimation waveform.

Further, the forward-rotation estimation waveform is not necessarily limited to the waveform exemplified in FIG. 3. It is sufficient that the forward-rotation estimation waveform has a similar outline to that of the line induced voltage. The estimation waveform having a similar outline means that when the line induced voltage takes a lower limit value, for example, the forward-rotation estimation waveform may take the lower limit, and when the line induced voltage takes a larger value than the lower limit value, the forward-rotation estimation waveform may take a larger value than the lower limit value. For example, the forward-rotation estimation waveform may be a rectangular wave exemplified in FIG. 21.

Without limiting to the forward-rotation similarity between the detected line induced voltage and the forward-rotation estimation waveform, reverse-rotation similarity between the detected line induced voltage and the reverse-rotation estimation waveform may be employed. Alternatively, both the forward-rotation similarity and the reverse-rotation similarity may be employed. This case will be described in detail.

The rotation-direction specifying unit 5 generates not only the forward-rotation estimation waveform but also the reverse-rotation estimation waveform. Because the generation of the reverse-rotation estimation waveform is similar to the generation of the forward-rotation estimation waveform, repeated description will be avoided. An evaluation function A2 of the reverse-rotation similarity can employ one of the following equations, for example.

$$A2 = \int |Vun - Vun\_I| dt \tag{3}$$

$$A2 = \int (Vun - Vun\_I)^2 dt \tag{4}$$

Where, Vun_I is a reverse-rotation estimation waveform of the line induced voltage Vun. The integration period is the same as the integration period employed in Expressions (1) and (2).

When the evaluation function A1 is smaller than the evaluation function A2, that is, when the forward-rotation similarity is higher than the reverse-rotation similarity, the rotation-direction specifying unit 5 may specify the rotation direction as the forward rotation direction. When the evaluation function A1 is larger than the evaluation function A2, that is, when the forward-rotation similarity is lower than the reverse-rotation similarity, the rotation-direction specifying unit 5 may specify the rotation direction as the reverse rotation direction.

According to the specification of the rotation direction as described above, because even when noise has occurred in common to the line induced voltages Vun and Vvn, a similar error occurs relative to the evaluation functions A1 and A2, the magnitude relation between the evaluation functions A1 and A2 do not easily change. Accordingly, specification accuracy of the rotation direction can be improved.

As one of noise that occurs in common in the line induced voltages Vun and Vvn, there is an offset described with reference to FIG. 25. As shown in FIG. 26, this offset Vof occurs in common in the line induced voltages Vun and Vvn detected by the voltage detector 3. Further, in FIG. 26, although the offset Vof shows constance regardless of time, the offset Vof actually changes according to a change in the DC voltage. Accordingly, the offset Vof behaves as noise that occurs in common in the line induced voltages Vun and Vvn.

Further, the waveform obtained by performing one of computation of addition and multiplication to the line induced voltages Vun and Vvn may be employed as an estimation waveform. For example, the sum of the line induced voltages Vun and Vvn at a normal rotation time is expressed as shown in FIG. 15. Accordingly, this waveform is employed as the forward-rotation estimation waveform V_N at the normal rotation time. Then, as the evaluation function A1, any one of the following expressions is employed.

$$A1 = \int |Vun + Vvn - V\_N| dt \quad (5)$$

$$A1 = \int (Vun + Vvn - V\_N)^2 dt \quad (6)$$

Even in this case, when the evaluation function A1 is smaller than the predetermined value, that is, when the forward-rotation similarity is larger than the predetermined value, the rotation direction may be specified as the forward rotation direction, and at the reverse time, the rotation direction may be specified as the reverse rotation direction.

The evaluation function A1 when the motor 2 is rotating in the reverse rotation direction in the ideal waveform takes a larger value (about two times) in Expression (5) than in Expression (1). When the motor 2 is rotating in the forward rotation direction in the ideal waveform, the evaluation function A1 takes zero. Accordingly, the difference between the evaluation function A1 when the motor 2 is rotating in the forward rotation direction and the evaluation function A1 when the motor 2 is rotating in the reverse rotation direction is larger in Expression (5) than in Expression (1). Because the rotation direction can be more easily distinguished when the difference is larger, the rotation direction of the motor 2 can be more easily specified by employing the evaluation function A1 of Expression (5) instead of Expression (1). Similarly, the rotation direction of the motor 2 can be more easily specified by employing the evaluation function A1 of Expression (6) instead of Expression (2).

Further, the product of the line induced voltages Vun and Vvn at the normal rotation time is expressed as shown in FIG. 16, for example. Accordingly, this waveform may be employed as the forward-rotation estimation waveform V_N at the normal rotation time. Then, as the evaluation function A1, any one of the following expressions is employed.

$$A1 = \int |Vun * Vvn - V\_N| dt \quad (7)$$

$$A1 = \int (Vun * Vvn - V\_N)^2 dt \quad (8)$$

Even in this case, when the evaluation function A1 is smaller than the predetermined value, that is, when the forward-rotation similarity is larger than the predetermined value, the rotation direction may be specified as the forward rotation direction, and at the reverse time, the rotation direction may be specified as reverse rotation direction.

The evaluation function A1 when the motor 2 is rotating in the reverse rotation direction in the ideal waveform takes a larger value (about four times) in Expression (7) than in Expression (1). When the motor 2 is rotating in the forward rotation direction in the ideal waveform, the evaluation function A1 takes zero. Accordingly, the difference between the evaluation function A1 when the motor 2 is rotating in the forward rotation direction and the evaluation function A1 when the motor 2 is rotating in the reverse rotation direction is larger in Expression (7) than in Expression (1). Therefore, the rotation direction of the motor 2 can be more easily specified by employing the evaluation function A1 of Expression (7) instead of Expression (1). Similarly, the rotation direction of the motor 2 can be more easily specified by employing the evaluation function A1 of Expression (8) instead of Expression (2).

The reverse-rotation similarity may be employed without depending on the forward-rotation similarity. Further, by employing both the forward-rotation similarity and the reverse-rotation similarity, the rotation direction may be specified based on the magnitude relation between the forward-rotation similarity and the reverse-rotation similarity.

Sixth Embodiment

In the sixth embodiment, an estimation value of a rotation position other than the rotation position determined as described in the first or second embodiment will be calculated.

As exemplified in FIG. 22, in the sixth embodiment, a rotation speed calculator 6 is further provided. The rotation speed calculator 6 receives from the detector 431 a notification that the line induced voltage Vun (or voltages Vun1 and Vun2, hereinafter similar in the present embodiment) and the line induced voltage Vvn (or the voltage Vvn1 and Vvn2, hereinafter similar in the present embodiment) match each other. Then, the rotation speed calculator 6 counts the period between a plurality of points in time when the line induced voltages Vun and Vvn match each other, for example, and calculates the rotation speed |ω| of the motor 2 based on the period. The period can be counted by using a known timer circuit and the like.

Further, the rotation position detector 4 receives a rotation direction D from the rotation-direction specifying unit 5, and receives the rotation speed |ω| from the rotation speed calculator 6.

Then, the rotation position detector 4 calculates an estimation value θe of a rotation position at other point in time, based on an estimation value θs (150 degrees or 330 degrees in this case) of a rotation position determined when the line induced voltages Vun and Vvn match each other, the rotation direction D, the rotation speed and time t from a point in time when the estimation value of the rotation position has been determined to the other point in time. The time t can be counted by using a known timer circuit and the like.

When the rotation direction D is the forward rotation direction, the estimation value θe of the rotation position is expressed by the following expression.

$$\theta e = \theta s + |\omega| \cdot t \quad (9)$$

When the rotation direction D is the reverse rotation direction, the estimation value θe of the rotation position is expressed by the following expression.

$$\theta e = \theta s - |\omega| \cdot t \qquad (10)$$

The rotation position detector 4 calculates the estimation value θe by using Expressions (9) and (10).

<Example of Concrete Operation>

Figure 23:
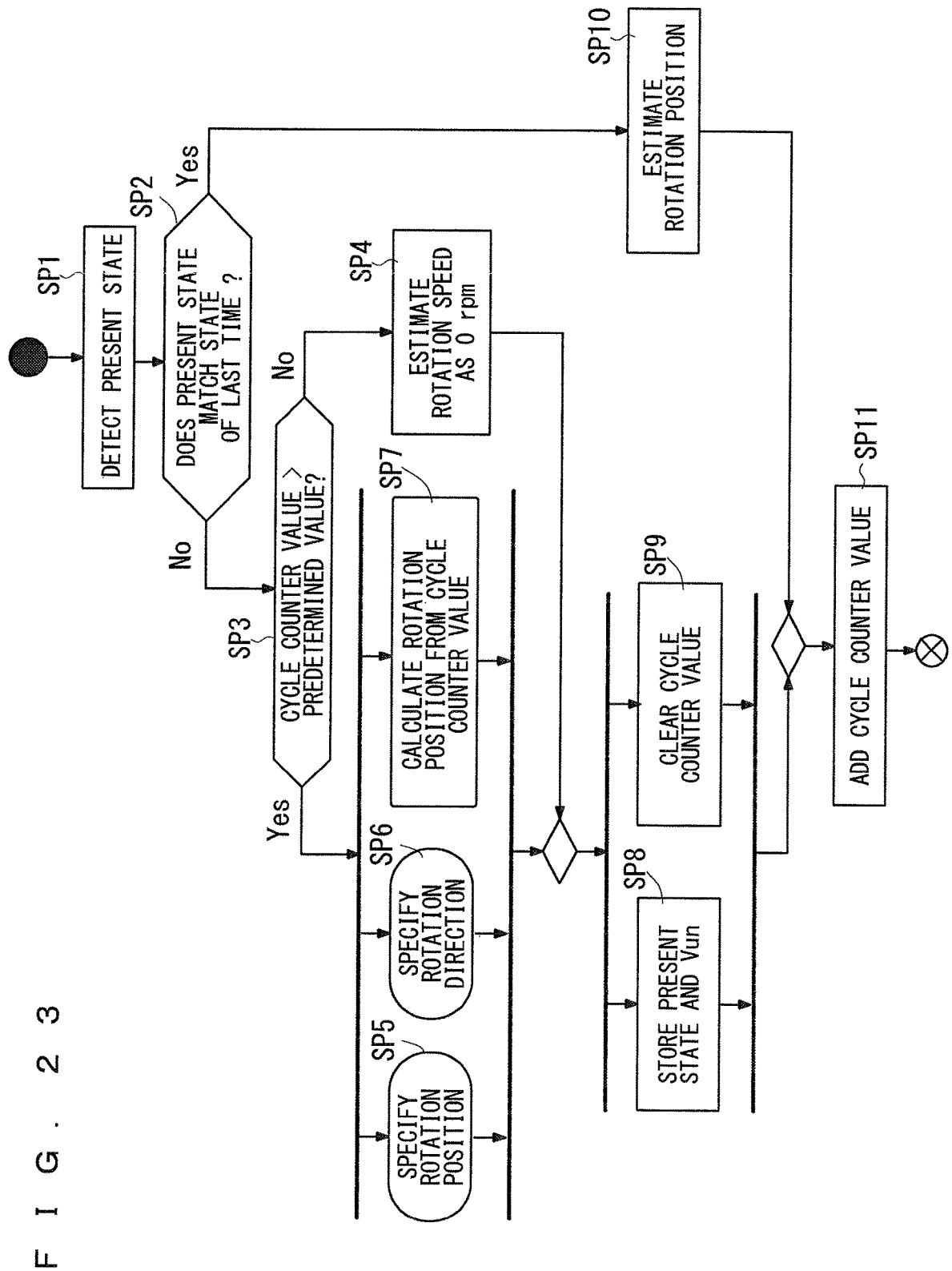
FIG. 23 is a flowchart showing an example of the operation of a rotation position detector, a rotation-direction specifying unit, and a rotation speed calculator.

FIG. 23 is a concrete example of the operation that the rotation position detector 4, the rotation-direction specifying unit 5, and the rotation speed calculator 6 execute. However, the series of processing are an example of the case where the estimation value θs of the rotation position is determined like in the first embodiment, and the rotation direction D is specified like in the third embodiment. The series of processing are executed repeatedly in each computation cycle.

First, in Step SP1, the detector 431 decides which one of the states A and B is the present state. Next, in Step SP2, the detector 431 decides whether present state matches the state of the last time. When a negative decision has been made, that is, when the magnitude relation between the line induced voltages Vun and Vvn has been changed, the rotation speed calculator 6 decides in Step SP3 whether the cycle counter value is larger than the threshold value determined in advance. The cycle counter value is the output value of a known counter circuit counted along with the time lapse, and is added in Step SP11 as described later, for example.

When a negative decision has been made in Step SP3, the rotation speed calculator 6 estimates in Step SP4 that the rotation speed is zero. When an affirmative decision has been made in Step SP3, the rotation speed calculator 6 executes Steps SP5 to SP7. The execution order of Steps SP5 to SP7 is arbitrary, and Steps SP5 to SP7 may be executed parallel to each other.

In Step SP5, the setting unit 432 determines the estimation value θs of the rotation position. This processing is executed by the series of processing shown in FIG. 8, for example. In Step SP6, the rotation-direction specifying unit 5 specifies the rotation direction. This processing is executed by the series of processing shown in FIG. 18, for example. In Step SP7, the rotation speed calculator 6 calculates the rotation speed |ω|. For example, the rotation speed calculator 6 reads the cycle counter value so that the rotation speed calculator 6 grasps the time t from when the magnitude relation between the line induced voltages Vun and Vvn has been switched last time, and calculates the rotation speed |ω| based on this. In FIGS. 3 and 4, for example, because the magnitude relation between the line induced voltages Vun and Vvn is switched twice per one rotation cycle, the rotation speed 10 is expressed by 1/(2t) [rps] (the time t is obtained from the cycle counter).

After Step SP4 has been executed, or after all Steps SP5 to SP7 have been executed, Steps SP8 and SP9 are executed. The execution order of Steps SP8 and SP9 is arbitrary, and Steps SP8 and SP9 may be executed parallel to each other.

The rotation-direction specifying unit 5 stores in Step SP8 the line induced voltage Vun, and the rotation speed calculator 6 initializes in Step SP9 the cycle counter value.

On the other hand, when an affirmative decision has been made in Step SP2, the setting unit 432 calculates in Step SP10 the estimation value θe of the rotation position based on Expression (9) or Expression (10). That is, when the magnitude relation between the line induced voltages Vun and Vvn has not been switched, the setting unit 432 calculates the rotation position by Expression (9) or Expression (10).

Then, after both Steps SP8 and SP9 have been executed, or after Step SP10 has been executed, the cycle counter value is added in Step SP11.

<Other Example of Concrete Operation>

Figure 24:
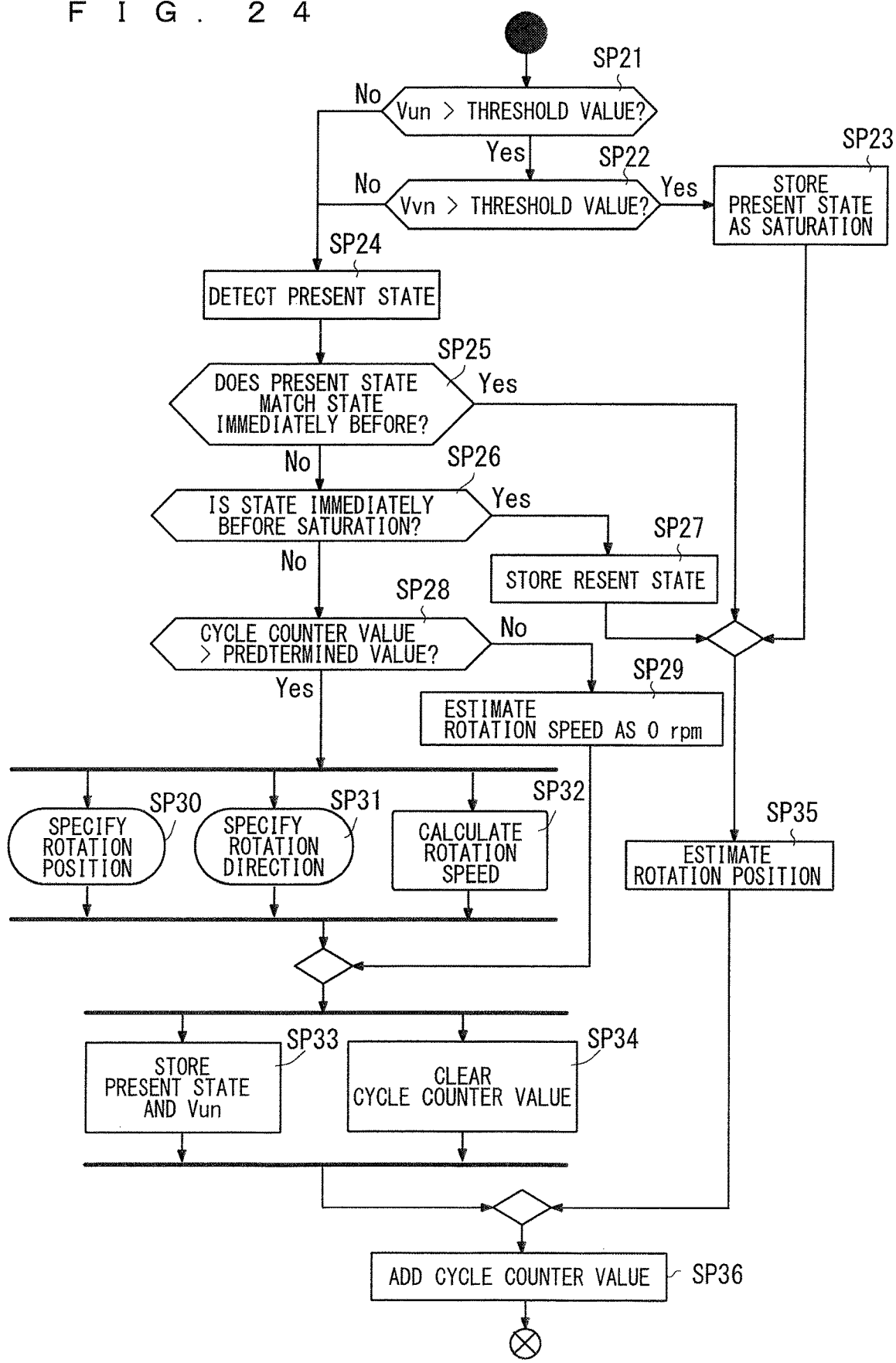
FIG. 24 is a flowchart showing an example of the operation of a rotation position detector, a rotation-direction specifying unit, and a rotation speed calculator.

FIG. 24 is a concrete example of the operation that the rotation position detector 4, the rotation-direction specifying unit 5, and the rotation speed calculator 6 execute. However, the series of processing are an example of the case where the estimation value θs of the rotation position is determined like in the second embodiment, and the rotation direction D is specified like in the fourth embodiment. The series of processing are executed repeatedly in each computation cycle.

Because the processing of Steps SP21 to SP27 is the same as Steps ST1 to ST7 in FIG. 19, description will be omitted. When a negative decision has been made in Step SP26, the rotation speed calculator 6 decides in Step SP28 whether the cycle counter value is larger than the threshold value determined in advance.

When a negative decision has been made in Step SP28, the rotation speed calculator 6 estimates in Step SP29 that the rotation speed is zero. When an affirmative decision has been made in Step SP28, Steps SP30 to SP32 are executed. The execution order of Steps SP30 to SP32 is arbitrary, and Steps SP30 to SP32 may be executed parallel to each other.

In Step SP30, the setting unit 432 determines the estimation value Os of the rotation position. This processing is executed by the series of processing shown in FIG. 8, for example. In Step SP31, the rotation-direction specifying unit 5 specifies the rotation direction. This processing is executed by the series of processing shown in FIG. 19, for example. In Step SP32, the rotation speed calculator 6 calculates the rotation speed |ω|. This processing is the same as Step SP7 shown in FIG. 23, for example.

After Step SP29 has been executed, or after all Steps SP30 to SP32 have been executed, Steps SP33 and SP34 are executed. The execution order of Steps SP33 and SP34 is arbitrary, and Steps SP33 and SP34 may be executed parallel to each other. Steps SP33 and SP34 are the same as Steps SP8 and SP9 shown in FIG. 23, respectively.

When an affirmative decision has been made in Step SP25, or when Step SP23 or Step SP27 has been executed, the setting unit 432 calculates in Step SP35 the estimation value θe of the rotation position based on Expression (9) or Expression (10). That is, when the magnitude relation between the line induced voltages Vun and Vvn has not been switched, the setting unit 432 calculates the rotation position by Expression (9) or Expression (10).

Then, after both Steps SP33 and SP34 have been executed or after Step SP35 has been executed, the cycle counter value is added in Step SP36.

The whole functions or a part of the functions of the rotation position detector 4 may be realized by a digital circuit, or may be realized by an analog circuit. This is similarly applied to the rotation-direction specifying unit 5 and the rotation speed calculator 6.

While the present disclosure has been described in detail, the above description is an exemplification in all aspects, and the present disclosure is not limited to this. Numerous modifications not exemplified are understood to be able to be assumed without deviating from the range of the present disclosure.

The invention claimed is:

1. A device for detecting a rotation position of a motor having a field including a permanent magnet, and an armature including coils of three or more phases, said field and said armature relatively rotating, comprising:

a detector that detects whether or not a first line induced voltage and a second line induced voltage match each other by only detecting induced voltages in two phases, said first line induced voltage being a potential difference of a first phase potential of phase potentials which said armature outputs due to an induced electromotive force relative to a reference potential, and the second line induced voltage being a potential difference of a second phase potential of said phase potentials other than said first phase potential relative to said reference potential, said reference potential being any one of a minimum phase and a maximum phase; and a rotation-position setting unit that sets, to a predetermined value, an estimation value of a rotation position of said motor at a point in time when said first line induced voltage and said second line induced voltage match each other.

2. The device for detecting the rotation position according to claim 1, wherein a plurality of AC lines are connected respectively to said coils, said AC lines are connected to an inverter, and said inverter is connected to first and second DC lines at an input side, and said device for detecting rotation position further comprising:

a voltage detector that has a first path connecting said first DC line and a first of said AC lines to which said first phase potential is applied and a second path connecting said first DC line and a second of said AC lines to which said second phase potential is applied, and that detects, as said first line induced voltage, a first voltage between said first DC line and said first of said AC lines in said first path and, as said second line induced voltage, a second voltage between said first DC line and said second of said AC lines in said second path.

3. The device for detecting the rotation position according to claim 2, wherein said voltage detector further has voltage-dividing resistors that are connected in series with each other in each of said first path and said second path, and voltages of said voltage-dividing resistors in said first path and said second path are respectively employed as said first voltage and said second voltage.

4. The device for detecting the rotation position according to claim 2, wherein said voltage detector further has a detection-voltage limiting unit that limits said first voltages to a predetermined value when said first line induced voltage is equal to or greater than a reference value, and limits said second voltages to said predetermined value when said second line induced voltage is equal to or greater than said reference value.

5. The device for detecting the rotation position according to claim 4, wherein said detector repeatedly detects a switching of a magnitude relation between said first voltage and said second voltage to repeatedly detect whether or not said first line induced voltage and said second line induced voltage match each other, said device for detecting rotation position further comprising:

a rotation-direction specifying unit that specifies a rotation direction of said motor as a predetermined direction when a phenomenon that said first voltage becomes higher than said second voltage to switch said magnitude relation occurs at least twice in succession, and that specifies said rotation direction as a direction opposite to said predetermined direction when a phenomenon that said first voltage becomes lower than said second voltage to switch said magnitude relation is switched occurs at least twice in succession.

6. The device for detecting the rotation position according to claim 4, wherein said detector detects whether or not said first voltage becomes higher than said second voltage and whether or not said first voltage becomes lower than said second voltage, and said device for detecting rotation position further comprising:

a rotation-direction specifying unit that specifies a rotation direction of said motor as a predetermined direction when at least one of said first voltage and said second voltage is smaller than a threshold value equal to or lower than said predetermined value and said first voltage becomes higher than said second voltage, and that specifies said rotation direction as a direction opposite to said predetermined direction when at least one of said first voltage and said second voltage is smaller than said threshold value equal to or lower than said predetermined value and said first voltage becomes lower than said second voltage.

7. The device for detecting the rotation position according to claim 2, further comprising:

a rotation-direction specifying unit that specifies a rotation direction of said motor, wherein said rotation-direction specifying unit calculates similarity between an estimation waveform similar to said first line induced voltage when said rotation direction is a predetermined direction, and said first line induced voltage which is detected, and specifies said rotation direction based on said similarity.

8. The device for detecting the rotation position according to claim 2, further comprising:

a rotation-direction specifying unit that specifies a rotation direction of said motor, wherein said rotation-direction specifying unit calculates similarity between an estimation waveform similar to a waveform obtained by performing a computation of one of addition and multiplication to said first line induced voltage and said second line induced voltage when said rotation direction is a predetermined direction, and a waveform obtained by performing said computation to said first line induced voltage and said second line induced voltage which are detected, and specifies said rotation direction based on said similarity.

9. The device for detecting the rotation position according to claim 1, further comprising:

a rotation-direction specifying unit that specifies a rotation direction of said motor as a predetermined direction, based on a value of said first line induced voltage or said second line induced voltage at said point in time when said first line induced voltage and said second line induced voltage match each other.

10. The device for detecting the rotation position according to claim 9, wherein said detector repeatedly detects whether or not said first line induced voltage and said second line induced voltage match each other, and said rotation-direction specifying unit specifies said rotation direction as said predetermined direction, based on a magnitude relation between a first value and a second value, said first value being a value of one of said first line induced voltage and said second line induced voltage at said point in time when said first line induced voltage and said second line induced voltage match each other, said second value being a value of said one of said first line induced voltage and said second line induced voltage at a point in time when said first line induced voltage and said second line induced voltage match each other at a last time.

11. The device for detecting the rotation position according to claim 10, wherein a computation result obtained by addition or multiplication of said first line induced voltage and said second line induced voltage at said point in time when said first line induced voltage and said second line induced voltage match each other is employed as said first value, and said computation result at a point in time when said first line induced voltage and said second line induced voltage match each other at a last time is employed as said second value.

12. The device for detecting the rotation position according to claim 9, wherein said detector repeatedly detects whether or not said first line induced voltage and said second line induced voltage match each other, said device for detecting rotation position further comprises a rotation speed calculator that calculates a rotation speed of said motor based on a plurality of points in time when said first line induced voltage and said second line induced voltage match each other, and said rotation-position setting unit, based on said estimation value of said rotation position that is set at said point in time when said first line induced voltage and said second line induced voltage match each other, said rotation direction that is specified by said rotation-direction specifying unit, said rotation speed calculated by said rotation speed calculator, and time from a point in time when said estimation value of said rotation position is set to an other point in time, calculates said rotation position at said other point in time.

13. An air conditioner comprising:

said device for detecting the rotation position according to claim 1;

said motor; and a fan driven by said motor.

* * * * *